United States Patent
Sherman et al.

(10) Patent No.: US 9,567,458 B2
(45) Date of Patent: Feb. 14, 2017

(54) MIXTURES OF POLYDIORGANOSILOXANE POLYAMIDE-CONTAINING COMPONENTS AND ORGANIC POLYMERS

(71) Applicant: 3M INNOVATIVE PROPERTIES COMPANY, St. Paul, MN (US)

(72) Inventors: Audrey A. Sherman, Woodbury, MN (US); David S. Hays, Woodbury, MN (US); Stephen A. Johnson, Woodbury, MN (US); Timothy J. Hebrink, Scandia, MN (US); Jeffrey O. Emslander, Stillwater, MN (US); Danny L. Fleming, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/057,454

(22) Filed: Mar. 1, 2016

(65) Prior Publication Data
US 2016/0177095 A1  Jun. 23, 2016

Related U.S. Application Data

(63) Continuation of application No. 14/730,644, filed on Jun. 4, 2015, now Pat. No. 9,303,157, which is a continuation of application No. 11/821,568, filed on Jun. 22, 2007, now abandoned.

(51) Int. Cl.
| | |
|---|---|
| C08L 83/04 | (2006.01) |
| C08L 23/06 | (2006.01) |
| C08L 83/10 | (2006.01) |
| C09J 7/02 | (2006.01) |
| C09J 183/10 | (2006.01) |
| B32B 7/12 | (2006.01) |
| B32B 27/28 | (2006.01) |
| C08L 23/08 | (2006.01) |
| C09D 123/06 | (2006.01) |
| C09D 123/08 | (2006.01) |
| C09J 123/06 | (2006.01) |
| C09J 123/08 | (2006.01) |
| C08G 77/455 | (2006.01) |

(52) U.S. Cl.
CPC .......... *C08L 23/06* (2013.01); *B32B 7/12* (2013.01); *B32B 27/283* (2013.01); *C08L 23/08* (2013.01); *C08L 83/10* (2013.01); *C09D 123/06* (2013.01); *C09D 123/08* (2013.01); *C09J 7/0246* (2013.01); *C09J 123/06* (2013.01); *C09J 123/08* (2013.01); *C09J 183/10* (2013.01); *B32B 2307/56* (2013.01); *C08G 77/455* (2013.01); *C08L 2201/08* (2013.01); *C08L 2203/16* (2013.01); *C08L 2205/03* (2013.01); *C08L 2205/06* (2013.01); *C08L 2207/066* (2013.01); *C09J 2483/00* (2013.01); *Y10T 428/24983* (2015.01); *Y10T 428/2852* (2015.01); *Y10T 428/31663* (2015.04)

(58) Field of Classification Search
None
See application file for complete search history.

(56) References Cited

U.S. PATENT DOCUMENTS

| | | | | |
|---|---|---|---|---|
| 4,822,852 A * | 4/1989 | Wittmann | ............... | C08L 51/04 525/431 |
| 5,089,250 A * | 2/1992 | Forestier | ................. | A61K 8/496 424/401 |
| 5,461,134 A | 10/1995 | Leir et al. | | |
| 5,500,209 A * | 3/1996 | Mendolia | ............. | A61K 8/0229 424/66 |
| 5,844,053 A * | 12/1998 | Nishida | .................... | C08L 63/00 525/476 |
| 5,874,069 A * | 2/1999 | Mendolia | ............... | A61K 8/042 424/401 |
| 7,041,194 B1 * | 5/2006 | Mueller | ................. | C08L 77/00 156/314 |
| 7,371,464 B2 * | 5/2008 | Sherman | ................ | C08G 69/42 428/447 |
| 7,501,184 B2 * | 3/2009 | Leir | ........................ | C08G 69/00 428/447 |
| 2004/0048998 A1 * | 3/2004 | Klein | ........................ | C08F 8/42 528/25 |
| 2007/0177273 A1 * | 8/2007 | Benson | ................... | B32B 27/28 359/584 |
| 2007/0297736 A1 * | 12/2007 | Sherman | ............. | G02F 1/13338 385/129 |
| 2008/0314492 A1 * | 12/2008 | Tsou | ........................ | B32B 7/12 152/510 |
| 2008/0318058 A1 * | 12/2008 | Sherman | ................ | C08G 69/42 428/423.1 |
| 2008/0318059 A1 * | 12/2008 | Sherman | ............. | C08G 77/455 428/423.1 |

FOREIGN PATENT DOCUMENTS

| | | |
|---|---|---|
| EP | 0421643 | 4/1991 |
| EP | 0822950 | 10/2001 |
| JP | 2-36234 | 2/1990 |
| WO | 96/34029 | 10/1996 |
| WO | 96/34030 | 10/1996 |

* cited by examiner

*Primary Examiner* — Robert S Loewe
(74) *Attorney, Agent, or Firm* — Jeffrey M. Olofson

(57) ABSTRACT

This invention relates to a mixture of a polydiorganosiloxane polyamide-containing material and an organic polymer.

22 Claims, No Drawings

MIXTURES OF POLYDIORGANOSILOXANE POLYAMIDE-CONTAINING COMPONENTS AND ORGANIC POLYMERS

TECHNICAL FIELD

This invention relates to a mixture of a polydiorganosiloxane polyamide-containing material and an organic polymer, in particular to mixtures that are useful as plastics, release surfaces, pressure sensitive adhesives, hot melt adhesives, vibration damping compositions, and the like.

BACKGROUND

Siloxane polymers have unique properties derived mainly from the physical and chemical characteristics of the siloxane bond. These properties include low glass transition temperature, thermal and oxidative stability, resistance to ultraviolet radiation, low surface energy and hydrophobicity, high permeability to many gases, and biocompatibility. The siloxane polymers, however, often lack tensile strength.

The low tensile strength of the siloxane polymers can be improved by forming block copolymers. Some block copolymers contain a "soft" siloxane polymeric block or segment and any of a variety of "hard" blocks or segments. Polydiorganosiloxane polyamides and polydiorganosiloxane polyamides are exemplary block copolymers.

Mixtures of polymeric components have also been used in various applications. Enhanced peel adhesion performance has been seen when acrylic pressure sensitive adhesives have been melt mixed with thermoplastic elastomers and subsequently extrusion coated onto various substrates. Polydiorganosiloxane polyamide has been mixed in solvent with dielectric polymers to form dielectric layers for the imaging sheets of an electrostatic printing process that releases more easily from later applied toners. However, good images result only when the polydiorganosiloxane polyamide contains a non-polydiorganosiloxane hard segment of at least 50 weight percent. A need still exists for other polymeric mixtures having a variety of properties and applications.

SUMMARY

The present invention provides a mixture that includes:
at least one copolymer comprising at least two repeat units of Formula I-a:

wherein:
each $R^1$ is independently an alkyl, haloalkyl, aralkyl, alkenyl, aryl, or aryl substituted with an alkyl, alkoxy, or halo;
each Y is independently an alkylene, aralkylene, or a combination thereof;
G is a divalent residue equal to a diamine of formula $R^3HN\text{-}G\text{-}NHR^3$ minus the two $-NHR^3$ groups;
$R^3$ is hydrogen or alkyl or $R^3$ taken together with G and to the nitrogen to which they are both attached form a heterocyclic group;
each group B is independently a covalent bond, an alkylene of 4-20 carbons, an aralkylene, an arylene, or a combination thereof;
n is independently an integer of 0 to 1500; and
p is an integer of 1 to 10; and
at least one organic polymer selected from the group of a hot melt processable thermoplastic, a hot melt processable elastomeric thermoset, a silicone polymer, and mixtures thereof;
wherein the at least one organic polymer is not a copolymer comprising at least two repeat units of Formula I-a, is not a tackifying resin, and is not nylon in the form of fibers; and
wherein the mixture does not occur at the interface between two layers.

In certain embodiments, the copolymer includes at least two repeat units of Formula I-b:

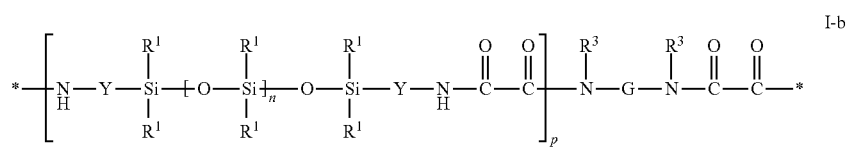

and wherein the at least one organic polymer is not a copolymer comprising at least two repeat units of Formula I-b.

In certain embodiments, each $R^1$ of the copolymer is methyl. In certain embodiments, at least 50 percent of the $R^1$ groups of the copolymer are phenyl, methyl, or combinations thereof.

In certain embodiments, each Y of the copolymer is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms. In certain embodiments, Y is an alkylene having 1 to 4 carbon atoms.

In certain embodiments, the copolymer has a first repeat unit where p is equal to 1 and a second repeat unit where p is at least 2.

In certain embodiments, G of the copolymer is an alkylene, heteroalkylene, arylene, aralkylene, polydiorganosiloxane, or a combination thereof.

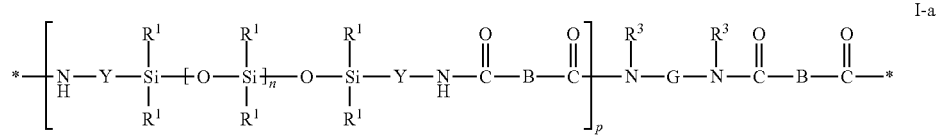

In certain embodiments, n of the copolymer is at least 40.

In certain embodiments, $R^3$ of the copolymer is hydrogen.

In certain embodiments, mixtures of the present invention can be further combined with at least one tackifying material. In certain embodiments, the tackifying material is a silicate resin or an organic tackifier.

In certain embodiments, mixtures of the present invention can be further combined with additives that are not hot melt processable.

In certain embodiments, the present invention provides a vibration damping constrained layer construction that includes at least one substrate having a stiffness and at least one layer including a tackified composition described herein, wherein the tackified composition is fixed to the substrate. In certain embodiments, the present invention provides a vibration damping composite including a flexible substrate coated thereon a mixture of the present invention.

In certain embodiments, the present invention provides a bi-directional vibration damping constrained layer construction that includes at least two rigid members, each rigid member having a broad surface proximate to a broad surface of another rigid member and closely spaced therefrom and a tackified composition described herein, wherein the tackified composition is contained between the closely spaced rigid members and adhered to the members.

In certain embodiments, the present invention provides a pressure sensitive adhesive article including a flexible substrate and coated thereon a tackified composition described herein.

In certain embodiments, the present invention provides a pressure sensitive adhesive article that includes a layer made of a mixture described herein having a surface that is non-tacky and a surface that is tacky.

In certain embodiments, the present invention provides a release coated article that includes a flexible substrate and coated thereon a mixture described herein.

In certain embodiments, the present invention provides an article that includes a mixture described herein. In certain embodiments, the article further includes a substrate, wherein the mixture that includes the copolymer is in a layer adjacent to the substrate. In certain embodiments, the article further includes a first substrate and a second substrate, wherein the mixture that includes the copolymer is in a layer positioned between the first substrate and the second substrate.

In certain embodiments, the present invention provides a multilayer film including one or more layers including a mixture described herein.

In certain embodiments, the present invention provides a process for producing a mixture, wherein the process includes: continuously providing at least one polydiorganosiloxane polyamide-containing component and at least one organic polymer to a vessel; mixing the components to form a mixture; and conveying the mixture from the vessel.

In certain embodiments, the mixing is under substantially solventless conditions.

In certain embodiments, the present invention provides a process for producing a mixture, wherein the process includes: continuously providing reactant components for making at least one polydiorganosiloxane polyamide and at least one organic polymer that is not reactive with the reactant components; mixing the components; allowing the reactant components to react to form a polydiorganosiloxane amide segmented copolymer, and conveying the mixture from the reactor.

These thermoplastic mixtures can be conceived for use in numerous applications: in sealants, adhesives, as material for fibers, as plastic additives, e.g., as impact modifiers or flame retardants, as material for defoamer formulations, as a high-performance polymer (thermoplastic, thermoplastic elastomer, elastomer), as packaging material for electronic components, in insulating materials or shielding materials, in cable sheathing, in antifouling materials, as an additive for scouring, cleaning or polishing products, as an additive for bodycare compositions, as a coating material for wood, paper, and board, as a mold release agent, as a biocompatible material in medical applications such as contact lenses, as a coating material for textile fibers or textile fabric, as a coating material for natural substances such as leather and furs, for example, as a material for membranes and as a material for photoactive systems, for example, for lithographic techniques, optical data securement or optical data transmission.

DEFINITIONS

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The terms "a", "an", and "the" are used interchangeably with "at least one" to mean one or more of the elements being described.

As used herein, the term "or" is generally employed in its sense including "and/or" unless the content clearly dictates otherwise.

The term "and/or" means one or all of the listed elements or a combination of any two or more of the listed elements.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "alkoxycarbonyl" refers to a monovalent group of formula —(CO)OR where R is an alkyl group and (CO) denotes a carbonyl group with the carbon attached to the oxygen with a double bond.

The term "aralkyl" refers to a monovalent group of formula —$R^a$—Ar where $R^a$ is an alkylene and Ar is an aryl group. That is, the aralkyl is an alkyl substituted with an aryl.

The term "aralkylene" refers to a divalent group of formula —R$\alpha$-Ar$^a$— where $R^a$ is an alkylene and Ar$^a$ is an arylene (i.e., an alkylene is bonded to an arylene).

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "aryloxy" refers to a monovalent group of formula —OAr where Ar is an aryl group.

The term "carbonyl" refers to a divalent group of formula —(CO)— where the carbon atom is attached to the oxygen atom with a double bond.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

The term "heteroalkylene" refers to a divalent group that includes at least two alkylene groups connected by a thio, oxy, or —NR— where R is alkyl. The heteroalkylene can be linear, branched, cyclic, or combinations thereof and can include up to 60 carbon atoms and up to 15 heteroatoms. In some embodiments, the heteroalkylene includes up to 50 carbon atoms, up to 40 carbon atoms, up to 30 carbon atoms, up to 20 carbon atoms, or up to 10 carbon atoms. Some heteroalkylenes are polyalkylene oxides where the heteroatom is oxygen.

The term "oxalyl" refers to a divalent group of formula —(CO)—(CO)— where each (CO) denotes a carbonyl group.

The terms "oxalylamino" and "aminoxalyl" are used interchangeably to refer to a divalent group of formula —(CO)—(CO)—NH— where each (CO) denotes a carbonyl.

The term "aminoxalylamino" refers to a divalent group of formula NH—(CO)—(CO)—NR$^d$— where each (CO) denotes a carbonyl group and R$^d$ is hydrogen, alkyl, or part of a heterocyclic group along with the nitrogen to which they are both attached. In most embodiments, R$^d$ is hydrogen or alkyl. In many embodiments, R$^d$ is hydrogen.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The term "polydiorganosiloxane" refers to a divalent segment of formula

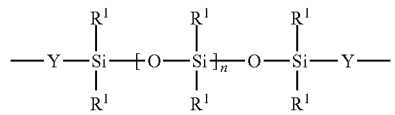

where each $R^1$ is independently an alkyl, haloalkyl, aralkyl, alkenyl, aryl, or aryl substituted with an alkyl, alkoxy, or halo; each Y is independently an alkylene, aralkylene, or a combination thereof; and subscript n is independently an integer of 0 to 1500.

The terms "room temperature" and "ambient temperature" are used interchangeably to mean temperatures in the range of 20° C. to 25° C.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

DETAILED DESCRIPTION OF ILLUSTRATIVE EMBODIMENTS

Mixtures containing polydiorganosiloxane polyamide block copolymers and organic polymers, methods of making the mixtures, compositions including the mixtures, and uses thereof are provided. The polydiorganosiloxane polyamide block copolymers are mixed with a variety of organic polymers including hot melt processable thermoplastic polymers (which may be elastomeric or nonelastomeric), hot melt processable elastomeric thermoset polymers, silicone polymers, or mixtures thereof.

The polydiorganosiloxane polyamide copolymers, which are of the (AB)$_n$ type, are the condensation reaction product of (a) a diamine having primary or secondary amino groups with (b) a precursor having at least one polydiorganosiloxane segment and at least two dicarboxamido ester groups (preferably oxalylamido ester groups). The copolymers have many of the desirable features of polysiloxanes such as low glass transition temperatures, thermal and oxidative stability, resistance to ultraviolet radiation, low surface energy and hydrophobicity, and high permeability to many gases. Additionally, the copolymers can have improved mechanical strength and elastomeric properties compared to polysiloxanes. At least some of the copolymers are optically clear, have a low refractive index, or both. Accordingly, at least some of the polymeric mixtures have similar properties.

The polymeric mixtures can be hot melt processable mixtures in that both the polydiorganosiloxane polyamide block copolymers and the organic polymers can be hot melt processed, i.e., can be processed by heating to a flowable melt state. Although hot melt processing is preferred for certain embodiments, it is not required, as these components (even though they are hot melt processable) can be mixed using solvents.

The relative amounts of these components in a given polymeric mixture or composition containing the mixture depend upon the particular rheological and mechanical properties sought, as well as the individual components themselves (e.g. the molecular weight of the organic polymer, the degree of polymerization of the polydiorganosiloxane polyamide copolymer). In general, however preferred compositions contain at least 0.1 percent by weight (wt-%) of the organic polymer, and no more than 99.9 wt-% of said polymer.

Organic Polymer Component

The organic polymer component is a hot melt processable thermoplastic polymer (which may be elastomeric or non-elastomeric), a hot melt processable elastomeric thermoset polymer, a silicone polymer, or mixtures thereof, excluding polydiorganosiloxane compounds as described herein (e.g., those of Formulas I-a and I-b). By "hot melt processable" it is meant that the polymer will melt and flow at a temperature at which the polydiorganosiloxane compounds of Formulas I-a and I-b will melt and flow. The silicone polymers are not "hot melt processable" per se since they are typically fluidic polymers with very low Tg values at room temperature, and flow at room temperature and above without the need for elevated temperatures.

The organic polymer may be solvent or melt mixed with the polydiorganosiloxane polyamide segmented copolymer. The organic polymer may be a polydiorganosiloxane polyamide-containing component or a polymer that does not contain polydiorganosiloxane segments; however it is not a polydiorganosiloxane polyamide compound of Formulas I-a or I-b.

At use temperature the mixtures generally have at least two domains, one discontinuous and the other continuous, because of the general immiscibility of the polydiorganosiloxane polyamide-containing component with the organic polymer. Of course, the mixture may contain more than one polydiorganosiloxane polyamide compound and more than one organic polymer.

Thermoplastic materials are generally materials that flow when heated sufficiently above their glass transition point and become solid when cooled. They may also have elastomeric properties.

Such mixtures do not include tackifying resins as the organic polymer, and do not include nylon in the form of fibers as the organic polymer, although nylon in other forms may be used. Furthermore, such mixtures are not at the interface between two layers.

Thermoplastic materials useful in the present invention that are generally considered nonelastomeric include, for example, polyolefins such as isotactic polypropylene, low density polyethylene, linear low density polyethylene, very low density polyethylene, medium density polyethylene, high density polyethylene, polybutylene, nonelastomeric polyolefin copolymers or terpolymers, such as ethylene/propylene copolymer and blends thereof; ethylene-vinyl acetate copolymers such as that available under the trade designation ELVAX 260, available from DuPont Chemical Co.; ethylene acrylic acid copolymers; ethylene methacrylic acid copolymers such as that available under the trade designation SURLYN 1702, available from DuPont Chemical Co.; polymethylmethacrylate; polystyrene; ethylene vinyl alcohol; polyester; amorphous polyester; polyamides; fluorinated thermoplastics, such a polyvinylidene fluoride, polytetrafluoroethylene, fluorinated ethylene/propylene copolymers and fluorinated ethylene/propylene copolymers; halogenated thermoplastics, such as a chlorinated polyethylene. Any single thermoplastic material can be mixed with at least one polydiorganosiloxane polyamide-containing component. Alternatively, a mixture of thermoplastic materials may be used.

Thermoplastic materials that have elastomeric properties are typically called thermoplastic elastomeric materials. Thermoplastic elastomeric materials are generally defined as materials that act as though they were covalently cross-linked, exhibiting high resilience and low creep, yet flow when heated above their softening point. Thermoplastic elastomeric materials useful in the present invention include, for example, linear, radial, star and tapered styrene-isoprene block copolymers such as that available under the trade designation KRATON D1107P from Shell Chemical Co. of Houston, Tex. and that available under the trade designation EUROPRENE SOL TE 9110 from EniChem Elastomers Americas, Inc. of Houston, Tex.; linear styrene-(ethylene-butylene) block copolymers such as that available under the trade designation KRATON G1657 from Shell Chemical Co.; linear styrene-(ethylene-propylene) block copolymers such as that available under the trade designation KRATON G1657X from Shell Chemical Co.; linear, radial, and star styrene-butadiene block copolymers such as that available under the trade designation KRATON D1118X from Shell Chemical Co. and that available under the trade designation EUROPRENE SOL TE 6205 from EniChem Elastomers Americas, Inc.; polyetheresters such as that available under the trade designation HYTREL G3548 from DuPont, elastomeric ethylene-propylene copolymers; thermoplastic elastomeric polyurethanes such as that available under the trade designation MORTHANE URETHENE PE44-203 from Morton International, Inc., Chicago, Ill.; self-tacky or tackified polyacrylates including $C_3$ to $C_{12}$ alkylesters that may contain other comonomers, such as for example, isooctyl acrylate and from 0 to 20 weight percent acrylic acid; polyvinylethers; poly-α-olefin-based thermoplastic elastomeric materials such as those represented by the formula —$(CH_2CHR)_x$ where R is an alkyl group containing 2 to 10 carbon atoms and poly-α-olefins based on metallocene catalysis such as that available under the trade designation ENGAGE EG8200, an ethylene/poly-α-olefin copolymer, available from Dow Plastics Co. of Midland, Mich.; as well as polydiorganosiloxane polyurea-urethanes, available from Wacker Chemie AG, Germany under the trade designation GENIOMER.

Thermoset elastomers (i.e., elastomeric thermosets) are materials that change irreversibly under the influence of heat from a fusible and soluble material into one that is infusible and insoluble through the formation of a covalently cross-linked, thermally stable network. Thermoset elastomers useful in the present invention include, for example, natural rubbers such as CV-60, a controlled viscosity grade available from Goodyear Chemical, Akron, Ohio, and SMR-5, a ribbed smoked sheet rubber; butyl rubbers, such as Exxon Butyl 268 available from Exxon Chemical Co.; synthetic polyisoprenes such as that available under the trade designation CARIFLEX IR309 from Royal Dutch Shell of Netherlands and that available under the trade designation NAT-SYN 2210 from Goodyear Tire and Rubber Co.; styrene-butadiene random copolymer rubbers such as that available under the trade designation AMERIPOL 1011A from BF Goodrich of Akron, Ohio; polybutadienes; polyisobutylenes such as that available under the trade designation VIS-TANEX MM L-80 from Exxon Chemical Co.; polyurethanes such as, for example, polyoctadecyl carbamate disclosed in U.S. Pat. No. 2,532,011; amorphous poly-α-olefins such as $C_4$-$C_{10}$ linear or branched poly-α-olefins; polydiorganosiloxane polyurea-containing components, such as those disclosed in U.S. Pat. No. 5,214,119.

Suitable silicone polymers are typically fluids and may be curable (through incorporation of suitable functional groups such as hydroxyl groups or ethylenically unsaturated groups, e.g., acrylate groups) or substantially noncurable. Examples of suitable silicone fluids are described in, for example, International Publication No. WO 97/40103, U.S. Pat. No. 6,441,118, U.S. Pat. No. 5,091,483, and U.S. Pat. Pub. No. 2005/0136266. Particularly preferred silicone polymers are moisture-curable silicone fluids, e.g., hydroxyl-terminated polydiorganosiloxanes or nonreactive silicone fluids such as that available under the trade designation 47V1000 RHODORSIL from Rhodia Silicones. Any of the hydroxyl-terminated polydiorganosiloxanes typically used in known silicone sealing and adhesive compositions may be used in the compositions of the present invention. Examples of suitable commercially available silicone fluids include those available under the trade designation MASIL from Lubruzol Corp. (Ohio) and Wacker Chemie AG (Germany).

Polydiorganosiloxane Polyamide-Containing Component

A linear, polydiorganosiloxane polyamide block copolymer useful in mixtures of the present invention contains at least two repeat units of Formula I-a:

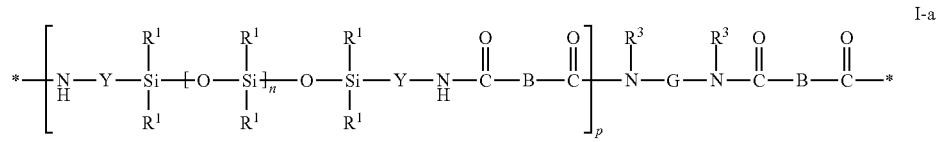

In this formula (I-a), each $R^1$ is independently an alkyl, haloalkyl, aralkyl, alkenyl, aryl, or aryl substituted with an alkyl, alkoxy, or halo. Each Y is independently an alkylene, aralkylene, or a combination thereof. Subscript n is independently an integer of 0 to 1500 and subscript p is an integer of 1 to 10. Group G is a divalent group that is the residue unit that is equal to a diamine of formula $R^3$HN-G-NHR$^3$ minus the two —NHR$^3$ groups (i.e., amino groups) where $R^3$ is hydrogen, alkyl, or forms a heterocyclic group when taken together with G and with the nitrogen to which it is attached. Each group B is independently a covalent bond, an alkylene of 4-20 carbons, an aralkylene, an arylene, or a combination thereof. When each group B is a covalent bond, the polydiorganosiloxane polyamide block copolymer of Formula I-a is referred to as a polydiorganosiloxane polyoxamide block copolymer, and preferably as the Formula I-b shown below. Each asterisk (*) indicates the position of attachment of the repeating unit to another group such as another repeat unit of Formula I-a.

A preferred linear, polydiorganosiloxane polyamide block copolymer useful in mixtures of the present invention contains at least two repeat units of Formula I-b:

In this Formula I-b, each $R^1$ is independently an alkyl, haloalkyl, aralkyl, alkenyl, aryl, or aryl substituted with an alkyl, alkoxy, or halo. Each Y is independently an alkylene, aralkylene, or a combination thereof. Subscript n is independently an integer of 0 to 1500 and the subscript p is an integer of 1 to 10. Group G is a divalent group that is the residue unit that is equal to a diamine of formula $R^3$HN-G-NHR$^3$ minus the two —NHR$^3$ groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3$HN-G-NHR$^3$ is piperazine or the like). Each asterisk (*) indicates a site of attachment of the repeat unit to another group in the copolymer such as, for example, another repeat unit of Formula I-b.

Suitable alkyl groups for $R^1$ in Formula I (I-a or I-b) typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some embodiments, in some repeat units of Formula I (I-a or I-b), at least 40 percent, and preferably at least 50 percent, of the $R^1$ groups are phenyl, methyl, or combinations thereof. For example, at least 60 percent, at least 70 percent, at least 80 percent, at least 90 percent, at least 95 percent, at least 98 percent, or at least 99 percent of the $R^1$ groups can be phenyl, methyl, or combinations thereof. In

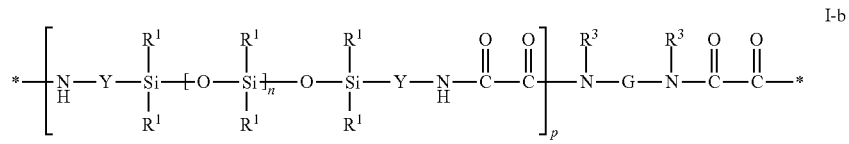

some embodiments, in some repeat units of Formula I (I-a or I-b), at least 40 percent, and preferably at least 50 percent, of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula I (I-a or I-b) is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula I (I-a or I-b) is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula I (I-a or I-b) is a residual unit that is equal to a diamine compound of formula $R^3HN$-G-$NHR^3$ minus the two amino groups (i.e., $-NHR^3$ groups). The diamine can have primary or secondary amino groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine). In most embodiments, $R^3$ is hydrogen or an alkyl. In many embodiments, both of the amino groups of the diamine are primary amino groups (i.e., both $R^3$ groups are hydrogen) and the diamine is of formula $H_2N$-G-$NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines of Formula III, which are described below, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

In preferred embodiments, the polydiorganosiloxane polyamide is a polydiorganosiloxane polyoxamide. The polydiorganosiloxane polyamide tends to be free of groups having a formula $-R^a-(CO)-NH-$ where $R^a$ is an alkylene. All of the carbonylamino groups along the backbone of the copolymeric material are part of an oxalylamino group (i.e., the $-(CO)-(CO)-NH-$ group). That is, any carbonyl group along the backbone of the copolymeric material is bonded to another carbonyl group and is part of an oxalyl group. More specifically, the polydiorganosiloxane polyamide has a plurality of aminoxalylamino groups.

The polydiorganosiloxane polyamide is a linear, block copolymer and can be an elastomeric material. Unlike many of the known polydiorganosiloxane polyamides that are generally formulated as brittle solids or hard plastics, the polydiorganosiloxane polyamides can be formulated to include greater than 50 weight percent polydiorganosiloxane segments based on the weight of the copolymer. The weight percent of the diorganosiloxane in the polydiorganosiloxane polyamides can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyamides. Higher amounts of the polydiorganosiloxane can be used to prepare elastomeric materials with lower modulus while maintaining reasonable strength.

Some of the polydiorganosiloxane polyamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to 350° C. Additionally, the copolymers can often be heated at a temperature such as 250° C. for 1 hour in air without apparent degradation as determined by no detectable loss of mechanical strength upon cooling.

Certain embodiments of the copolymeric material of Formula I (I-a or I-b) can be optically clear. As used herein, the term "optically clear" refers to a material that is clear to the human eye. An optically clear copolymeric material often has a luminous transmission of at least 90 percent, a haze of less than 2 percent, and opacity of less than about 1 percent in the 400 to 700 nm wavelength range. Both the luminous transmission and the haze can be determined using, for example, the method of ASTM-D 1003-95.

Additionally, certain embodiments of the copolymeric material of Formula I (I-a or I-b) can have a low refractive index. As used herein, the term "refractive index" refers to the absolute refractive index of a material (e.g., copolymeric material) and is the ratio of the speed of electromagnetic radiation in free space to the speed of the electromagnetic radiation in the material of interest. The electromagnetic radiation is white light. The index of refraction is measured using an Abbe refractometer, available commercially, for example, from Fisher Instruments of Pittsburgh, Pa. The measurement of the refractive index can depend, to some extent, on the particular refractometer used. The copolymeric material usually has a refractive index in the range of 1.41 to 1.50.

The polydiorganosiloxane polyamides are soluble in many common organic solvents such as, for example, toluene, tetrahydrofuran, dichloromethane, aliphatic hydrocarbons (e.g., alkanes such as hexane), or mixtures thereof.

Optional Additives

Functional components, tackifiers, plasticizers, and other property modifiers may be incorporated in the organic polymer, the polydiorganosiloxane polyamide segmented organic polymer, or both of the components of the mixtures of the present invention. Preferred optional additives are not hot melt processable. That is, they do not melt and flow at the temperatures at which the hot melt processable organic polymer and the polydiorganosiloxane polyamide segmented organic polymer melt and flow.

Functional components include, for example, antistatic additives, ultraviolet light absorbers (UVAs), hindered amine light stabilizers (HALS), dyes, colorants, pigments, antioxidants, slip agents, low adhesion materials, conductive materials, abrasion resistant materials, optical elements, dimensional stabilizers, adhesives, tackifiers, flame retardants, phosphorescent materials, fluorescent materials, nanoparticles, anti-graffiti agents, dew-resistant agents, load bearing agents, silicate resins, fumed silica, glass beads, glass bubbles, glass fibers, mineral fibers, clay particles, organic fibers, e.g., nylon, KEVLAR, metal particles, and the like. Such optional additives can be added in amounts up to 100 parts per 100 parts of the sum of the organic polymer and the polydiorganosiloxane polyamide segmented polymeric component, provided that if and when incorporated, such additives are not detrimental to the function and functionality of the final polymer product. Other additives such as light diffusing materials, light absorptive materials and optical brighteners, flame retardants, stabilizers, antioxidants, compatibilizers, antimicrobial agents such as zinc oxide, electrical conductors, thermal conductors such as aluminum oxide, boron nitride, aluminum nitride, and nickel particles, including organic and/or inorganic particles, or any number or combination thereof, can be blended into these systems. The functional components listed above may also be incorporated into polydiorganosiloxane polyamide block copolymer provided such incorporation does not adversely affect any of the resulting product to an undesirable extent.

Tackifying materials or plasticizers useful with the polymeric materials are preferably miscible at the molecular level, e.g., soluble in, any or all of the polymeric segments of the elastomeric material or the thermoplastic elastomeric material. These tackifying materials or plasticizers are generally immiscible with the polydiorganosiloxane polyamide-containing component. When the tackifying material is present it generally comprises 5 to 300 parts by weight, more typically up to 200 parts by weight, based on 100 parts by weight of the polymeric material.

Examples of tackifiers suitable for the invention include but are not limited to liquid rubbers, hydrocarbon resins, rosin, natural resins such as dimerized or hydrogenated balsams and esterified abietic acids, polyterpenes, terpene phenolics, phenol-formaldehyde resins, and rosin esters.

Examples of plasticizers include but are not limited to polybutene, paraffinic oils, petrolatum, and certain phthalates with long aliphatic side chains such as ditridecyl phthalate.

Other suitable tackifiers include silicate tackifying resins. Suitable silicate tackifying resins include those resins composed of the following structural units M (i.e., monovalent $R_3SiO_{1/2}$ units), D (i.e., divalent $R_2SiO_{2/2}$ units), T (i.e., trivalent $RSiO_{3/2}$ units), and Q (i.e., quaternary $SiO_{4/2}$ units), and combinations thereof. Typical exemplary silicate resins include MQ silicate tackifying resins, MQD silicate tackifying resins, and MQT silicate tackifying resins. These silicate tackifying resins usually have a number average molecular weight in the range of 100 to 50,000 or in the range of 500 to 15,000 and generally have methyl R groups.

MQ silicate tackifying resins are copolymeric resins having $R_3SiO_{1/2}$ units ("M" units) and $SiO_{4/2}$ units ("Q" units), where the M units are bonded to the Q units, each of which is bonded to at least one other Q unit. Some of the $SiO_{4/2}$ units ("Q" units) are bonded to hydroxyl radicals resulting in $HOSiO_{3/2}$ units ("TOH" units), thereby accounting for the silicon-bonded hydroxyl content of the silicate tackifying resin, and some are bonded only to other $SiO_{4/2}$ units.

Such resins are described in, for example, *Encyclopedia of Polymer Science and Engineering*, vol. 15, John Wiley & Sons, New York, (1989), pp. 265-270, and U.S. Pat. No. 2,676,182 (Daudt et al.), U.S. Pat. No. 3,627,851 (Brady), U.S. Pat. No. 3,772,247 (Flannigan), and U.S. Pat. No. 5,248,739 (Schmidt et al.). Other examples are disclosed in U.S. Pat. No. 5,082,706 (Tangney). The above-described resins are generally prepared in solvent. Dried or solventless, M silicone tackifying resins can be prepared, as described in U.S. Pat. No. 5,319,040 (Wengrovius et al.), U.S. Pat. No. 5,302,685 (Tsumura et al.), and U.S. Pat. No. 4,935,484 (Wolfgruber et al.).

Certain MQ silicate tackifying resins can be prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). These modified processes often include limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is often stabilized with an alcohol, such as 2-propanol, and capped with $R_3SiO_{1/2}$ siloxane units as soon as possible after being neutralized. The level of silicon bonded hydroxyl groups (i.e., silanol) on the MQ resin may be reduced to no greater than 1.5 weight percent, no greater than 1.2 weight percent, no greater than 1.0 weight percent, or no greater than 0.8 weight percent based on the weight of the silicate tackifying resin. This may be accomplished, for example, by reacting hexamethyldisilazane with the silicate tackifying resin. Such a reaction may be catalyzed, for example, with trifluoroacetic acid. Alternatively, trimethylchlorosilane or trimethylsilylacetamide may be reacted with the silicate tackifying resin, a catalyst not being necessary in this case.

MQD silicone tackifying resins are terpolymers having $R_3SiO_{1/2}$ units ("M" units), $SiO_{4/2}$ units ("Q" units), and $R_2SiO_{2/2}$ units ("D" units) such as are taught in U.S. Pat. No. 2,736,721 (Dexter). In MQD silicone tackifying resins, some of the methyl R groups of the $R_2SiO_{2/2}$ units ("D" units) can be replaced with vinyl ($CH_2=CH-$) groups ("DVi" units).

MQT silicate tackifying resins are terpolymers having R3SiO1/2 units, SiO4/2 units and RSiO3/2 units ("T" units) such as are taught in U.S. Pat. No. 5,110,890 (Butler) and Japanese Kokai HE 2-36234.

Suitable silicate tackifying resins are commercially available from sources such as Dow Corning, Midland, Mich., General Electric Silicones Waterford, N.Y. and Rhodia Silicones, Rock Hill, S.C. Examples of particularly useful MQ silicate tackifying resins include those available under the trade designations SR-545 and SR-1000, both of which are commercially available from GE Silicones, Waterford, N.Y. Such resins are generally supplied in organic solvent and may be employed in the formulations of the adhesives of the present invention as received. Blends of two or more silicate resins can be included in the adhesive compositions.

Methods of Making Polydiorganosiloxane Polyamide Copolymers

The linear block copolymers having repeat units of Formula I (I-a or I-b) can be prepared, for example, as represented in Reaction Scheme A.

Additionally, the diamine is free of any carbonylamino group. That is, the diamine is not an amide.

Exemplary polyoxyalkylene diamines (i.e., G is a heteroalkylene with the heteroatom being oxygen) include, but are not limited to, those commercially available from Huntsman, The Woodlands, Tex. under the trade designation JEFFAMINE D-230 (i.e., polyoxypropropylene diamine having an average molecular weight of 230 g/mole), JEFFAMINE D-400 (i.e., polyoxypropylene diamine having an average molecular weight of 400 g/mole), JEFFAMINE D-2000 (i.e., polyoxypropylene diamine having an average molecular weight of 2,000 g/mole), JEFFAMINE HK-511 (i.e., polyetherdiamine with both oxyethylene and oxypropylene groups and having an average molecular weight of 220 g/mole), JEFFAMINE ED-2003 (i.e., polypropylene oxide capped polyethylene glycol having an average molecular weight of 2,000 g/mole), and JEFFAMINE EDR-148 (i.e., triethyleneglycol diamine).

Exemplary alkylene diamines (i.e., G is a alkylene) include, but are not limited to, ethylene diamine, propylene Reaction Scheme A

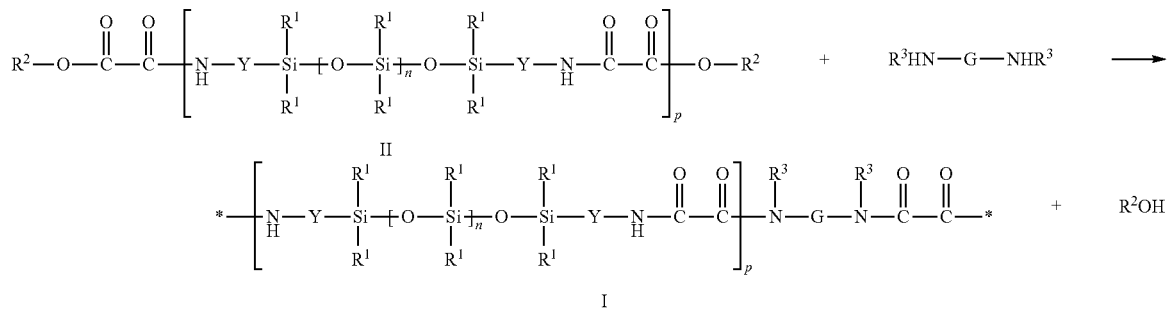

In this reaction scheme, a precursor of Formula II is combined under reaction conditions with a diamine having two primary or secondary amino groups, two secondary amino groups, or one primary amino group and one secondary amino group. The diamine is usually of formula $R^3HN$-G-$NHR^3$. The $R^2OH$ by-product is typically removed from the resulting polydiorganosiloxane polyamide.

The diamine $R^3HN$-G-$NHR^3$ in Reaction Scheme A has two amino groups (i.e., —$NHR^3$). Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., the diamine is piperazine or the like). In most embodiments, $R^3$ is hydrogen or alkyl. In many embodiments, the diamine has two primary amino groups (i.e., each $R^3$ group is hydrogen) and the diamine is of formula $H_2N$-G-$NH_2$. The portion of the diamine exclusive of the two amino groups is referred to as group G in Formula I (I-a or I-b).

The diamines are sometimes classified as organic diamines or polydiorganosiloxane diamines with the organic diamines including, for example, those selected from alkylene diamines, heteroalkylene diamines, arylene diamines, aralkylene diamines, or alkylene-aralkylene diamines. The diamine has only two amino groups so that the resulting polydiorganosiloxane polyamides are linear block copolymers that are often elastomeric, molten at elevated temperatures, and soluble in some common organic solvents. The diamine is free of a polyamine having more than two primary or secondary amino groups. Tertiary amines that do not react with the precursor of Formula II can be present.

diamine, butylene diamine, hexamethylene diamine, 2-methylpentamethylene 1,5-diamine (i.e., commercially available from DuPont, Wilmington, Del. under the trade designation DYTEK A), 1,3-pentane diamine (commercially available from DuPont under the trade designation DYTEK EP), 1,4-cyclohexane diamine, 1,2-cyclohexane diamine (commercially available from DuPont under the trade designation DHC-99), 4,4'-bis(aminocyclohexyl)methane, and 3-aminomethyl-3,5,5-trimethylcyclohexylamine.

Exemplary arylene diamines (i.e., G is an arylene such as phenylene) include, but are not limited to, m-phenylene diamine, o-phenylene diamine, and p-phenylene diamine. Exemplary aralkylene diamines (i.e., G is an aralkylene such as alkylene-phenyl) include, but are not limited to 4-aminomethyl-phenylamine, 3-aminomethyl-phenylamine, and 2-aminomethyl-phenylamine. Exemplary alkylene-aralkylene diamines (i.e., G is an alkylene-aralkylene such as alkylene-phenylene-alkylene) include, but are not limited to, 4-aminomethyl-benzylamine, 3-aminomethyl-benzylamine, and 2-aminomethyl-benzylamine.

The precursor of Formula II in Reaction Scheme A has at least one polydiorganosiloxane segment and at least two oxalylamino groups. Group $R^1$, group Y, subscript n, and subscript p are the same as described for Formula I (I-a or I-b). Each group $R^2$ is independently an alkyl, haloalkyl, aryl, or aryl substituted with an alkyl, alkoxy, halo, or alkoxycarbonyl. The precursor of Formula II can include a single compound (i.e., all the compounds have the same value of p and n) or can include a plurality of compounds (i.e., the compounds have different values for p, different values for n, or different values for both p and n). Precursors with different n values have siloxane chains of different length. Precursors having a p value of at least 2 are chain extended.

In some embodiments, the precursor is a mixture of a first compound of Formula II with subscript p equal to 1 and a second compound of Formula II with subscript p equal to at least 2. The first compound can include a plurality of different compounds with different values of n. The second compound can include a plurality of compounds with different values of p, different values of n, or different values of both p and n. Mixtures can include at least 50 weight percent of the first compound of Formula II (i.e., p is equal to 1) and no greater than 50 weight percent of the second compound of Formula II (i.e., p is equal to at least 2) based on the sum of the weight of the first and second compounds in the mixture. In some mixtures, the first compound is present in an amount of at least 55 weight percent, at least 60 weight percent, at least 65 weight percent, at least 70 weight percent, at least 75 weight percent, at least 80 weight percent, at least 85 weight percent, at least 90 weight percent, at least 95 weight percent, or at least 98 weight percent based on the total amount of the compounds of Formula II. The mixtures often contain no greater than 50 weight percent, no greater than 45 weight percent, no greater than 40 weight percent, no greater than 35 weight percent, no greater than 30 weight percent, no greater than 25 weight percent, no greater than 20 weight percent, no greater than 15 weight percent, no greater than 10 weight percent, no greater than 5 weight percent, or no greater than 2 weight percent of the second compound.

Different amounts of the chain-extended precursor of Formula II in the mixture can affect the final properties of the elastomeric material of Formula I (I-a or I-b). That is, the amount of the second compound of Formula II (i.e., p equal to at least 2) can be varied advantageously to provide elastomeric materials with a range of properties. For example, a higher amount of the second compound of Formula II can alter the melt rheology (e.g., the elastomeric material can flow easier when present as a melt), alter the softness of the elastomeric material, lower the modulus of the elastomeric material, or a combination thereof.

Reaction Scheme A can be conducted using a plurality of precursors of Formula II, a plurality of diamines, or a combination thereof. A plurality of precursors having different average molecular weights can be combined under reaction conditions with a single diamine or with multiple diamines. For example, the precursor of Formula II may include a mixture of materials with different values of n, different values of p, or different values of both n and p. The multiple diamines can include, for example, a first diamine that is an organic diamine and a second diamine that is a polydiorganosiloxane diamine. Likewise, a single precursor can be combined under reaction conditions with multiple diamines.

For certain embodiments, the molar ratio of the precursor of Formula II to the diamine is often 1:1. For example, the molar ratio is often less than or equal to 1:0.80, less than or equal to 1:0.85, less than or equal to 1:0.90, less than or equal to 1:0.95, or less than or equal to 1:1. The molar ratio is often greater than or equal to 1:1.05, greater than or equal to 1:1.10, or greater than or equal to 1:1.15. For example, the molar ratio can be in the range of 1:0.80 to 1:1.20, in the range of 1:0.80 to 1:1.15, in the range of 1:0.80 to 1:1.10, in the range of 1:0.80 to 1:1.05, in the range of 1:0.90 to 1:1.10, or in the range of 1:0.95 to 1:1.05.

For certain embodiments, the molar ratio of the precursor of Formula II to the diamine is less than 1:1.20 or greater than 1:0.80. For example, it can be 1:0.50, 1:0.55, 1:0.60, 1:0.65, 1:0.70, or 1:0.75, or it can be 1:1.25, 1:1.30, or 1:1.35. For example, the molar ratio can be in the range of less than 1:1.20 down to and including 1:2.00. Alternatively, it can be in the range of greater than 1:0.80 up to and including 1:0.50.

Varying the molar ratio can be used, for example, to alter the overall molecular weight, which can effect the rheology of the resulting copolymers. Additionally, varying the molar ratio can be used to provide oxalylamino-containing end groups or amino end groups, depending upon which reactant is present in molar excess.

The condensation reaction of the precursor of Formula II with the diamine (i.e., Reaction Scheme A) is often conducted at room temperature or at elevated temperatures such as at temperatures up to 250° C. For example, the reaction often can be conducted at room temperature or at temperatures up to 100° C. In other examples, the reaction can be conducted at a temperature of at least 100° C., at least 120° C., or at least 150° C. For example, the reaction temperature is often in the range of 100° C. to 220° C., in the range of 120° C. to 220° C., or in the range of 150° C. to 200° C. The condensation reaction is often complete in less than 1 hour, in less than 2 hours, in less than 4 hours, in less than 8 hours, or in less than 12 hours.

Reaction Scheme A can occur in the presence or absence of a solvent. Suitable solvents usually do not react with any of the reactants or products of the reactions. Additionally, suitable solvents are usually capable of maintaining all the reactants and all of the products in solution throughout the polymerization process. Exemplary solvents include, but are not limited to, toluene, tetrahydrofuran, dichloromethane, aliphatic hydrocarbons (e.g., alkanes such as hexane), or mixtures thereof.

Any solvent that is present can be stripped from the resulting polydiorganosiloxane polyamide at the completion of the reaction. Solvents that can be removed under the same conditions used to remove the alcohol by-product are often preferred. The stripping process is often conducted at a temperature of at least 100° C., at least 125° C., or at least 150° C. The stripping process is typically at a temperature less than 300° C., less than 250° C., or less than 225° C.

Conducting Reaction Scheme A in the absence of a solvent can be desirable because only the volatile by-product, $R^2OH$, needs to be removed at the conclusion of the reaction. Additionally, a solvent that is not compatible with both reactants and the product can result in incomplete reaction and a low degree of polymerization.

Any suitable reactor or process can be used to prepare the copolymeric material according to Reaction Scheme A. The reaction can be conducted using a batch process, semi-batch process, or a continuous process. Exemplary batch processes can be conducted in a reaction vessel equipped with a mechanical stirrer such as a Brabender mixer, provided the product of the reaction is in a molten state has a sufficiently low viscosity to be drained from the reactor. Exemplary semi-batch process can be conducted in a continuously stirred tube, tank, or fluidized bed. Exemplary continuous processes can be conducted in a single screw or twin screw extruder such as a wiped surface counter-rotating or co-rotating twin screw extruder.

In many processes, the components are metered and then mixed together to form a reaction mixture. The components can be metered volumetrically or gravimetrically using, for example, a gear, piston or progressing cavity pump. The components can be mixed using any known static or dynamic method such as, for example, static mixers, or compounding mixers such as single or multiple screw extruders. The reaction mixture can then be formed, poured, pumped, coated, injection molded, sprayed, sputtered, atomized, stranded or sheeted, and partially or completely polymerized. The partially or completely polymerized material can then optionally be converted to a particle, droplet, pellet, sphere, strand, ribbon, rod, tube, film, sheet, coextruded film, web, non-woven, microreplicated structure, or other continuous or discrete shape, prior to the transformation to solid polymer. Any of these steps can be conducted in the presence or absence of applied heat. In one exemplary process, the components can be metered using a gear pump, mixed using a static mixer, and injected into a mold prior to solidification of the polymerizing material.

The polydiorganosiloxane-containing precursor of Formula II in Reaction Scheme A can be prepared by any known method. In some embodiments, this precursor is prepared according to Reaction Scheme B.

Reaction Scheme B

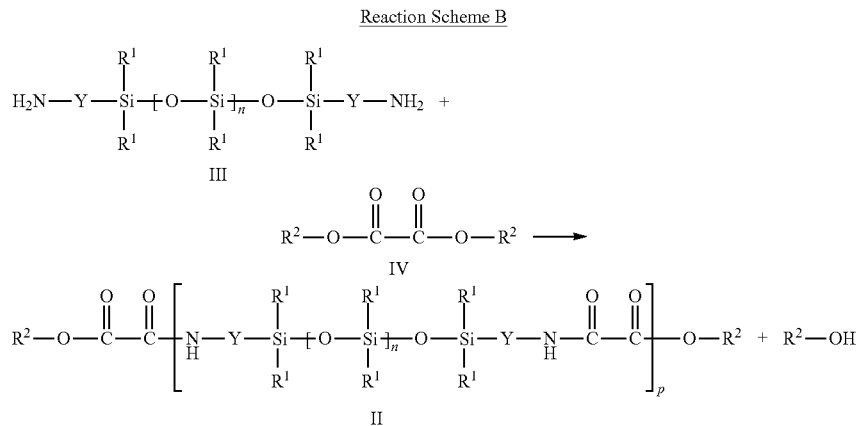

A polydiorganosiloxane diamine of Formula III (p moles) is reacted with a molar excess of an oxalate of Formula IV (greater than p+1 moles) under an inert atmosphere to produce the polydiorganosiloxane-containing precursor of Formula II and $R^2$—OH by-product. In this reaction, $R^1$, Y, n, and p are the same as previously described for Formula I (I-a or I-b). Each $R^2$ in Formula IV is independently an alkyl, haloalkyl, aryl, or aryl substituted with an alkyl, alkoxy, halo, or alkoxycarbonyl. The preparation of the precursor of Formula II according to Reaction Scheme B is further described in Applicant's Assignee's copending U.S. patent application Ser. No. 11/317,616, filed on Dec. 23, 2005.

The polydiorganosiloxane diamine of Formula III in Reaction Scheme B can be prepared by any known method and can have any suitable molecular weight, such as an average molecular weight in the range of 700 to 150,000 g/mole. Suitable polydiorganosiloxane diamines and methods of making the polydiorganosiloxane diamines are described, for example, in U.S. Pat. No. 3,890,269 (Martin), U.S. Pat. No. 4,661,577 (Jo Lane et al.), U.S. Pat. No. 5,026,890 (Webb et al.), U.S. Pat. No. 5,276,122 (Aoki et al.), U.S. Pat. No. 5,214,119 (Leir et al.), U.S. Pat. No. 5,461,134 (Leir et al.), U.S. Pat. No. 5,512,650 (Leir et al.), and U.S. Pat. No. 6,355,759 (Sherman et al.), incorporated herein by reference in their entirety. Some polydiorganosiloxane diamines are commercially available, for example, from Shin Etsu Silicones of America, Inc., Torrance, Calif. and from Gelest Inc., Morrisville, Pa.

A polydiorganosiloxane diamine having a molecular weight greater than 2,000 g/mole or greater than 5,000 g/mole can be prepared using the methods described in U.S. Pat. No. 5,214,119 (Leir et al.), U.S. Pat. No. 5,461,134 (Leir et al.), and U.S. Pat. No. 5,512,650 (Leir et al.). One of the described methods involves combining under reaction conditions and under an inert atmosphere (a) an amine functional end blocker of the following formula

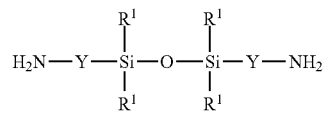

where Y and $R^1$ are the same as defined for Formula I (I-a or I-b); (b) sufficient cyclic siloxane to react with the amine functional end blocker to form a polydiorganosiloxane diamine having a molecular weight less than 2,000 g/mole; and (c) an anhydrous aminoalkyl silanolate catalyst of the following formula

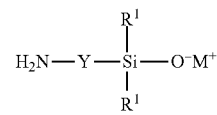

where Y and $R^1$ are the same as defined in Formula I (I-a or I-b) and W is a sodium ion, potassium ion, cesium ion, rubidium ion, or tetramethylammonium ion. The reaction is continued until substantially all of the amine functional end blocker is consumed and then additional cyclic siloxane is added to increase the molecular weight. The additional cyclic siloxane is often added slowly (e.g., drop wise). The reaction temperature is often conducted in the range of 80° C. to 90° C. with a reaction time of 5 to 7 hours. The resulting polydiorganosiloxane diamine can be of high purity (e.g., less than 2 weight percent, less than 1.5 weight percent, less than 1 weight percent, less than 0.5 weight percent, less than 0.1 weight percent, less than 0.05 weight percent, or less than 0.01 weight percent silanol impurities). Altering the ratio of the amine end functional blocker to the cyclic siloxane can be used to vary the molecular weight of the resulting polydiorganosiloxane diamine of Formula III.

Another method of preparing the polydiorganosiloxane diamine of Formula III includes combining under reaction conditions and under an inert environment (a) an amine functional end blocker of the following formula

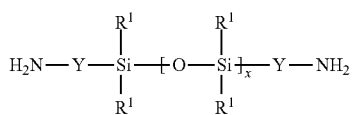

where $R^1$ and Y are the same as described for Formula I (I-a or I-b) and where the subscript x is equal to an integer of 1 to 150; (b) sufficient cyclic siloxane to obtain a polydiorganosiloxane diamine having an average molecular weight greater than the average molecular weight of the amine functional end blocker; and (c) a catalyst selected from cesium hydroxide, cesium silanolate, rubidium silanolate, cesium polysiloxanolate, rubidium polysiloxanolate, and mixtures thereof. The reaction is continued until substantially all of the amine functional end blocker is consumed. This method is further described in U.S. Pat. No. 6,355,759 B1 (Sherman et al.). This procedure can be used to prepare any molecular weight of the polydiorganosiloxane diamine.

Yet another method of preparing the polydiorganosiloxane diamine of Formula III is described in U.S. Pat. No. 6,531,620 B2 (Brader et al.). In this method, a cyclic silazane is reacted with a siloxane material having hydroxy end groups as shown in the following reaction.

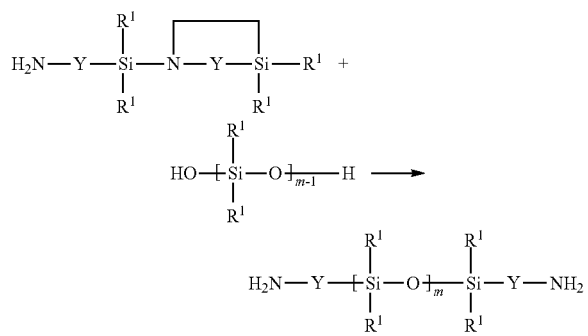

The groups $R^1$ and Y are the same as described for Formula I (I-a or I-b). The subscript m is an integer greater than 1.

Examples of polydiorganosiloxane diamines include, but are not limited to, polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and mixtures thereof.

In Reaction Scheme B, an oxalate of Formula IV is reacted with the polydiorganosiloxane diamine of Formula III under an inert atmosphere. The two $R^2$ groups in the oxalate of Formula IV can be the same or different. In some methods, the two $R^2$ groups are different and have different reactivity with the polydiorganosiloxane diamine of Formula III in Reaction Scheme B.

Group $R^2$ can be an alkyl, haloalkyl, aryl, or aryl substituted with an alkyl, alkoxy, halo, or alkoxycarbonyl. Suitable alkyl and haloalkyl groups for $R^2$ often have 1 to 10, 1 to 6, or 1 to 4 carbon atoms. Although tertiary alkyl (e.g., tert-butyl) and haloalkyl groups can be used, there is often a primary or secondary carbon atom attached directly (i.e., bonded) to the adjacent oxy group. Exemplary alkyl groups include methyl, ethyl, n-propyl, iso-propyl, n-butyl, and iso-butyl. Exemplary haloalkyl groups include chloroalkyl groups and fluoroalkyl groups in which some, but not all, of the hydrogen atoms on the corresponding alkyl group are replaced with halo atoms. For example, the chloroalkyl or a fluoroalkyl groups can be chloromethyl, 2-chloroethyl, 2,2,2-trichloroethyl, 3-chloropropyl, 4-chlorobutyl, fluoromethyl, 2-fluoroethyl, 2,2,2-trifluoroethyl, 3-fluoropropyl, 4-fluorobutyl, and the like. Suitable aryl groups for $R^2$ include those having 6 to 12 carbon atoms such as, for example, phenyl. An aryl group can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), or alkoxycarbonyl (e.g., an alkoxycarbonyl having 2 to 5 carbon atoms such as methoxycarbonyl, ethoxycarbonyl, or propoxycarbonyl).

The oxalates of Formula IV in Reaction Scheme B can be prepared, for example, by reaction of an alcohol of formula $R^2$—OH with oxalyl dichloride. Commercially available oxalates of Formula IV (e.g., from Sigma-Aldrich, Milwaukee, Wis. and from VWR International, Bristol, Conn.) include, but are not limited to, dimethyl oxalate, diethyl oxalate, di-n-butyl oxalate, di-tert-butyl oxalate, bis(phenyl) oxalate, bis(pentafluorophenyl) oxalate, 1-(2,6-difluorophenyl)-2-(2,3,4,5,6-pentachlorophenyl) oxalate, and bis (2,4,6-trichlorophenyl) oxalate.

A molar excess of the oxalate is used in Reaction Scheme B. That is, the molar ratio of oxalate to polydiorganosiloxane diamine is greater than the stoichiometric molar ratio, which is (p+1):p. The molar ratio is often greater than 2:1, greater than 3:1, greater than 4:1, or greater than 6:1. The condensation reaction typically occurs under an inert atmosphere and at room temperature upon mixing of the components.

The condensation reaction used to produce the precursor of Formula II (i.e., Reaction Scheme B) can occur in the presence or absence of a solvent. In some methods, no solvent or only a small amount of solvent is included in the reaction mixture. In other methods, a solvent may be included such as, for example, toluene, tetrahydrofuran, dichloromethane, or aliphatic hydrocarbons (e.g., alkanes such as hexane).

Removal of excess oxalate from the precursor of Formula II prior to reaction with the diamine in Reaction Scheme A tends to favor formation of an optically clear polydiorganosiloxane polyamide. The excess oxalate can typically be removed from the precursor using a stripping process. For example, the reacted mixture (i.e., the product or products of the condensation reaction according to Reaction Scheme B) can be heated to a temperature up to 150° C., up to 175° C., up to 200° C., up to 225° C., or up to 250° C. to volatilize the excess oxalate. A vacuum can be pulled to lower the temperature that is needed for removal of the excess oxalate. The precursor compounds of Formula II tend to undergo minimal or no apparent degradation at temperatures in the range of 200° C. to 250° C. or higher. Any other known methods of removing the excess oxalate can be used.

The by-product of the condensation reaction shown in Reaction Scheme B is an alcohol (i.e., $R^2$—OH is an alcohol). Group $R^2$ is often limited to an alkyl having 1 to 4 carbon atoms, a haloalkyl having 1 to 4 carbon atoms, or an aryl such as phenyl that form an alcohol that can be readily removed (e.g., vaporized) by heating at temperatures no greater than 250° C. Such an alcohol can be removed when the reacted mixture is heated to a temperature sufficient to remove the excess oxalate of Formula IV.

Processes of Making Compositions and Constructions

The compositions and constructions of the present invention can be made by solvent-based processes known to the art, by a solventless process, or by a combination of the two.

One skilled in the art can expect the optimum material for a particular application to be a function of the architecture and ratios of the polydiorganosiloxane polyamide-containing component, the architecture and ratios of organic polymer, optional initiator architecture, and whether any functional components, additives, or property modifiers are added.

The organic polymer is generally added as a molten stream to the polydiorganosiloxane polyamide-containing component or to one of the reactants of the polydiorganosiloxane polyamide-containing component. Sometimes the polymeric material needs to be melted in a separate vessel before the polydiorganosiloxane polyamide-containing component is added (1) as pellets, (2) as reactants or (3) as a separate molten stream from a second vessel. Examples when a separate vessel is preferred include, for example, when (1) additives are preferred to concentrate in the organic polymer, (2) organic polymers need high processing temperatures, and (3) organic polymers include elastomeric thermoset materials.

The order of adding the various components is important in forming the mixture. If the organic polymer is substantially unreactive with the reactants for making the polydiorganosiloxane polyamide (e.g., diamines) as discussed earlier, any order of addition can be used. The polydiorganosiloxane polyamide-containing component can be added to the organic polymer, and vice versa, or the polydiorganosiloxane polyamide-containing component can be made in the presence of the organic polymer. However, the organic polymer must be added after the polydiorganosiloxane polyamide-containing component is formed if the organic polymer is reactive with the reactants for making such component. Also, the organic polymer is preferably sufficiently heated to a processable state in a separate vessel and added to a molten stream of the polydiorganosiloxane polyamide-containing component if the temperature needed to process the organic polymer would degrade the polydiorganosiloxane polyamide-containing component.

Other additives such as plasticizing materials, tackifying materials, pigments, fillers, initiators, and the like can generally be added at any point in the process since they are usually not reactive with the reactants but are typically added after a substantial amount of the polydiorganosiloxane polyamide-containing component is formed.

When mixing organic polymers that are non-thermoplastic elastomeric materials with polydiorganosiloxane polyamide-containing components, the former generally needs special conditions to be melt processed. Two methods of making non-thermoplastic elastomeric materials melt processable are (1) reducing their apparent melt viscosity by swelling them with tackifying or plasticizing material or (2) masticating the materials as described in U.S. Pat. No. 5,539,033.

Four process considerations can affect the final properties of the mixtures made by the solventless process. First, the properties of polydiorganosiloxane polyamide-containing component could be affected by whether the polydiorganosiloxane polyamide-containing component is made in a solvent or an essentially solventless process. Second, the polydiorganosiloxane polyamide-containing component can degrade if exposed to too much heat and shear. Third, the stability of the mixture is affected by how the polydiorganosiloxane polyamide-containing component is mixed with the organic polymer. Fourth, the morphology of the article made with the mixture is determined by the interaction of the processing parameters and characteristics of the components in the mixture.

In a first consideration, the polydiorganosiloxane polyamide-containing component can be made previously by either a solvent or solventless process or can be made in the presence of the organic polymer. Methods of making the polydiorganosiloxane polyamide-containing component in solvent were disclosed above. Methods of making the polydiorganosiloxane polyamide-containing component in substantially solventless conditions can result in polydiorganosiloxane polyamide-containing component high in molecular weight.

In a second consideration, the polydiorganosiloxane polyamide-containing component can degrade if it is heated too much under shear conditions, particularly in the presence of oxygen. The polydiorganosiloxane polyamide-containing component is exposed to the least amount of heat and shear when made in the presence of the organic polymer, and in particular, when the mixture is made under an inert atmosphere.

In a third consideration, the stability of the mixture is affected by how the polydiorganosiloxane polyamide-containing component is mixed with the organic polymer. Polydiorganosiloxanes are generally immiscible with most other polymeric materials. However, the inventors have found that a wide variety of polymers can be mixed with a polydiorganosiloxane polyamide-containing component when both are in the molten state. Care must be taken that the conditions needed to soften one component does not degrade the other. Preferably, the mixing temperature should be at a temperature above the mixing and conveying temperature of the mixture and below the degradation temperature of the polydiorganosiloxane polyamide-containing component. The polydiorganosiloxane polyoxamide copolymer can usually be subjected to elevated temperatures up to 250° C. or higher without apparent degradation.

Any vessel in which the components can be adequately heated and mixed in the molten state is suitable for making mixtures of the invention.

In a fourth consideration, the processing steps influence the morphology of an article made with the mixtures of the invention. The mixtures generally have at least two domains, one discontinuous and the other continuous, because of the general immiscibility of the polydiorganosiloxane polyamide-containing component with the organic polymer. The component comprising the minor phase typically forms discontinuous domains that range in shape from spheroidal to ellipsoidal to ribbon-like to fibrous. The component comprising the major phase typically forms the continuous domain that surrounds the discontinuous domains. The discontinuous domains of the mixture generally elongate if the mixture is subjected to sufficient shear or extensional forces as the mixture is formed into an article, such as a film or coating. The discontinuous domains generally remain elongated if at least one of the components has a sufficient viscosity at use temperature to prevent the elongated domain from relaxing into a sphere when the mixture is no longer under extensional or shear forces. The elongated morphology is usually stable until the mixture is reheated above the softening point of the components.

While both a solvent based process and a solventless process for making the mixtures of the invention can be used, there may be some situations where a combination of the two is preferred. In the latter case, a polydiorganosiloxane polyamide-containing component could be made by the solvent based process and subsequently dried and melt mixed with the organic polymer.

Types of Articles

Polymeric mixtures of the present invention and compositions containing them, depending on specific formulation, can be used to make a variety of articles. They can be used, for example, as release films, optical films and filters, diffuse optical articles, process aids, optical pressure sensitive adhesives, pressure sensitive adhesive tapes, pressure sensitive adhesive transfer tapes, pressure sensitive adhesive medical tapes, including, for example, transdermal drug delivering devices, rubber-toughened articles, or pressure sensitive adhesive coatings directly onto desired articles. They can also be used, for example, as hot melt adhesives, nonwoven webs, water repellant films, anti-graffiti films, casting liners, vibration dampers, acoustic dampers, medical backings, tape backings, sealants, reflective polarizers, reflectors including infrared radiation reflectors, and permeable films. They can be formed into unsupported films, coated on a support substrate, and/or incorporated into one or more layers of a multilayer film.

Polymeric mixtures of the present invention and compositions containing them can be used in melt process aids. Surface modification, slip aids, compatibilizers, refractive index modifiers, impact modifiers, optics modifiers, rheology modifiers, permeability modifiers, water repellency modifiers, fiber treatment materials to impart a perfect smoothness modifiers, lubricity modifiers, tack modifiers (e.g., to reduce tackiness), and modifiers of tactile sensation.

Polymeric mixtures of the present invention and compositions containing them, dependent on specific formulation used, can be pressure sensitive adhesive materials, heat activated adhesives, vibration damping materials, and non-adhesive materials. To employ non-adhesive vibration damping materials requires the use of a bonding agent, that is, a material to affix the damping material to either a constraining layer and/or a resonating structure depending on the particular use geometry desired.

Polymeric mixtures of the present invention and compositions containing them can be cast from solvents as film, molded or embossed in various shapes, or extruded into films. They can be formed into various articles, for example, one that includes a layer containing the mixture containing the polydiorganosiloxane polyamide copolymer and one or more optional substrates. For example, the polydiorganosiloxane polyamide copolymer-containing mixture can be in a layer adjacent to a first substrate or positioned between a first substrate and a second substrate. That is, the article can be arranged in the following order: a first substrate, a layer containing the polydiorganosiloxane polyamide copolymer-containing mixture, and a second substrate. As used herein, the term "adjacent" refers to a first layer that contacts a second layer or that is positioned in proximity to the second layer but separated from the second layer by one or more additional layers.

Pressure sensitive adhesive articles are made by applying the pressure sensitive adhesive by well known hot melt or solvent coating process. Any suitable substrates that can by used, including, but not limited to, for example, cloth and fiber-glass cloth, metallized films and foils, polymeric films, nonwovens, paper and polymer coated paper, and foam backings. Polymer films include, but are not limited to, polyolefins such as polypropylene, polyethylene, low density polyethylene, linear low density polyethylene and high density polyethylene; polyesters such as polyethylene terephthalate; polycarbonates; cellulose acetates; polyimides such as that available under the trade designation KAPTON. Nonwovens, generally made from randomly oriented fibers, include, but are not limited by, nylon, polypropylene, ethylene-vinyl acetate copolymer, polyurethane, rayon and the like. Foam backings include, but are not limited to, acrylic, silicone, polyurethane, polyethylene, neoprene rubber, and polypropylene, and may be filled or unfilled. Backings that are layered, such as polyethylene-aluminum membrane composites, are also suitable.

In the case of pressure sensitive tapes, these materials are typically applied by first making a tape construction which comprises a layer of the pressure sensitive adhesive material coated on a backing. The exposed surface of the pressure sensitive adhesive coating may be subsequently applied to a surface from which it could be released later or directly to the desired substrate.

Some pressure sensitive adhesive articles use release liners, i.e., transfer tapes that can be made by coating the composition between two liners both of which are coated with a release coating. The release liners typically comprise polymeric material such as polyester, polyethylene, polyolefin and the like, or release coated paper or polyethylene coated paper. Preferably, each release liner is first coated or primed with a release material for the adhesive materials utilized in the invention. When the mixture contains a significant amount of a tackified polydiorganosiloxane polyamide-containing component, useful release liners include those that are suitable for use with silicone adhesives. One example is the polyfluoropolyether coated liner described in European Patent Publication No. 433070. Other useful release liner release coating compositions are described in European Patent Publication No. 378420, U.S. Pat. No. 4,889,753, and European Patent Publication No. 311262. Commercially available liners and compositions include that available under the trade designation SYL-OFF Q2-7785 fluorosilicone release coating from Dow Corning Corp., Midland, Mich., X-70-029NS fluorosilicone release coatings available from Shin-Etsu Silicones of America, Inc., Torrance, Calif.; that available under the trade designation S TAKE-OFF 2402 fluorosilicone release liner from Release International, Bedford Park, Ill.; and the like.

Polymeric mixtures of the present invention and compositions containing them are also useful in medical applications including transdermal drug delivery devices. Transdermal drug delivery devices are designed to deliver a therapeutically effective amount of drug through or to the skin of a patient. Transdermal drug delivery provides significant advantages; unlike injection, it is noninvasive; unlike oral administration, it avoids hepatic first pass metabolism, it minimizes gastrointestinal effects, and it provides stable blood levels.

Polymeric mixtures of the present invention and compositions containing them may also be used in pressure sensitive adhesives that readily attach to prepared and unprepared surfaces, especially metals, polyolefin and fluorine containing polymeric films, providing a highly conformable, continuous interfacial silicone coating that prevents ingress of environmental contaminants including those that corrosively attack unprotected surfaces. A pressure sensitive adhesive patch typically consists of a protective polydiorganosiloxane polyamide-containing pressure sensitive adhesive mixture and optionally a barrier or edge adhesive, layers of conformable barrier or backing materials, or combinations of these materials. For some applications it is preferable that the backing does not shield electric field lines, making an open structure backing more preferable to solid films of, for example, polyethylene or PVC. A tapered or profiled adhesive layer to better match surface topology may be preferred when patching some surfaces.

Polymeric mixtures of the present invention and compositions containing them may also be used as pressure sensitive adhesives or hot melt adhesives for heat shrink tubes. These constructions provide a single article that can withstand the high temperatures experienced during the heat shrink operation and provide an environmental seal after cooling. The rheology, heat stability, tack, and clarity of these materials make them especially suitable for this application.

Polymeric mixtures of the present invention and compositions containing them can also be coated onto a differential release liner; i.e., a release liner having a first release coating on one side of the liner and a second release coating coated on the opposite side. The two release coatings preferably have different release values. For example, one release coating may have a release value of 5 grams/cm (that is, 5 grams of force is needed to remove a strip of material 1 cm wide from the coating) while the second release coating may have a release value of 15 grams/cm. The material can be coated over the release liner coating having the higher release value. The resulting tape can be wound into a roll. As the tape is unwound, the pressure sensitive adhesive adheres to the release coating with the higher release value. After the tape is applied to a substrate, the release liner can be removed to expose an adhesive surface for further use.

Hot melt adhesives are compositions that can be used to bond nonadhering surfaces together into a composite. During application to a substrate, hot melt adhesives should be sufficiently fluid to wet the surface completely and leave no voids, even if the surface is rough. Consequently, the adhesive must be low in viscosity at the time of application. However, the bonding adhesive generally sets into a solid to develop sufficient cohesive strength to remain adhered to the substrate under stressful conditions.

For hot melt adhesives, the transition from fluid to solid may be accomplished in several ways. First, the hot melt adhesive may be a thermoplastic that softens and melts when heated and becomes hard again when cooled. Such heating results in sufficiently high fluidity to achieve successful wetting. Alternatively, the hot melt adhesive may be dissolved in a solvent or carrier that lowers the viscosity of the adhesive sufficiently to permit satisfactory wetting and raises the adhesive viscosity when the solvent or carrier is removed. Such an adhesive can be heat activated, if necessary.

Polymeric mixtures of the present invention and compositions containing them may also be used as vibration damping materials alone, that is, free layer treatment, or in conjunction with a stiff layer, that is, as part of a constrained-layer treatment. Vibration damping materials are most efficiently used if they are sandwiched between the structure/device to be damped and a relatively stiff layer, such as thin sheet metal. This forces the viscoelastic material to be deformed in shear as the panel vibrates, dissipating substantially more energy than when the material deforms in extension and compression, as occurs in a free layer treatment. Preferably, constrained-layer constructions consist of a laminate of one or more stiff layers and one or more layers of the vibration damping material.

Constrained-layer constructions can be prepared by several processes. In one process, a layer of the vibration damping material is coated onto a release liner by conventional solution coating or hot melt coating techniques known in the art. The layer of resulting viscoelastic material is transferred to a stiff backing and adhered thereto, thereby providing a constrained-layer construction. In another process, a layer of vibration damping material is coated directly onto a stiff backing by conventional solution coating or hot melt coating techniques known in the art. In each case, the constrained-layer construction is then affixed to the structure requiring damping. The construction may be attached in any manner provided that the constraining layer is only fixed to the vibrating structure via the viscoelastic material interface, i.e. free of mechanical attachment. When the structure subsequently vibrates under the influence of an internally or externally applied force, the vibration is damped.

Another application of the vibration damping materials of the present invention is in a bi-directional damping unit such as described in Neilsen, E. J. et al, "Viscoelastic Damper Overview For Seismic and Wind Applications," Structural Engineering Association of California, Tahoe Olympiad, October, 1994. Bi-directional, or large displacement, damping is the transference of subsonic oscillations of a structure, such as a building, into the shear deformation of a viscoelastic material for the purpose of damping the oscillations of the structure. In this application, materials which have maximum vibration damping capability preferably have shear storage moduli, G', of $6.9 \times 10^3$ Pa to $3.45 \times 10^7$ Pa, more preferably $3.45 \times 10^4$ Pa to $1.4 \times 10^7$ Pa, most preferably $3.45 \times 10^5$ Pa to $6.9 \times 10^6$ Pa at the use temperature, and have a tan δ as high as possible over the use temperature and frequency range. The materials also preferably have an elongation in tension of at least 100 percent or a shear strain capability of at least 100 percent within their use range of temperature and frequency.

When the vibration damping material has pressure sensitive adhesive properties, the material can usually be adhered to a stiff layer without the use of an additional bonding agent. However, it is sometimes necessary to use a thin layer, for example, 20-50 μm in thickness, of a high strength adhesive, such as, for example, an acrylic adhesive, an epoxy adhesive, or a silicone adhesive, all of which are well-known to those skilled in the art, to bond the vibration damping composition of the invention to a structure.

For most applications, the layer of vibration damping material has a thickness of at least 0.01 mm up to 100 mm, more preferably 0.05 to 100 mm. The damping material can be applied by any of the techniques known in the art such as by spraying, dipping, knife, or curtain coating, or molding, laminating, casting, or extruding.

As mentioned above, a stiff layer is an essential part of constrained-layer vibration-damping constructions of the present invention. A suitable material for a stiff layer preferably has a stiffness of at least 100 times the stiffness, i.e., storage modulus, of the vibration damping material, the stiffness of the stiff layer being measured in extension. The desired stiffness of the stiff layer can be varied by adjusting the thickness of this layer, for example, from 25 micrometers to 5 centimeters, depending on the modulus of the stiff layer. Examples of suitable stiff materials for use in a constrained-layer construction include, for example, metals such as iron, steel, nickel, aluminum, chromium, cobalt, and copper, and alloys thereof and stiff polymeric materials such as polystyrene; polyester; polyvinyl chloride; polyurethane; polycarbonate; polyimide; and polyepoxide; fiber-reinforced plastics such as glass fiber-reinforced, ceramic fiber-reinforced, and metal fiber-reinforced polyester; glasses; and ceramics.

The vibration damping compositions of the present invention are useful in a variety of applications that demand effective damping over a broad range of temperature and frequency, with the additional requirement that minimum and/or maximum modulus requirements, over a specified range of temperatures, also be satisfied. It is often desirable that the region of maximum damping, that is, the point at which the loss factor is near a maximum occurs in the center of the desired damping temperature and frequency range. Designing the optimum damping material for a specific application requires understanding the effect the polydiorganosiloxane polyamide segmented copolymer, the organic polymer, the silicate resin, optional polydiorganosiloxane oligopolyamide segmented copolymer and filler, and concentration of each have on damping performance.

In the case of vibration damping materials providing pressure sensitive adhesive properties, these materials are typically applied by first making a tape construction which comprises a layer of the vibration damping material coated between two liners at least one of which is coated with a release material. The vibration damping materials of the invention having pressure sensitive adhesive qualities and adhere well to polyesters, polycarbonates, polyolefins such as polyethylene and polypropylene, and TEFLON of which the latter two classes of materials are traditionally known to be difficult materials to bond with adhesives.

The present invention provides the following embodiments:

1. A mixture comprising:
at least one copolymer comprising at least two repeat units of Formula I-a:

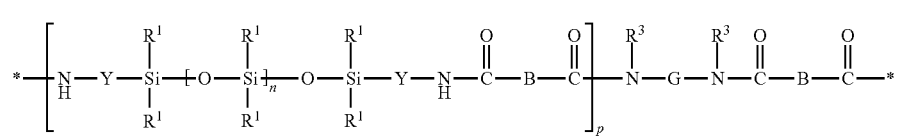

wherein:
each $R^1$ is independently an alkyl, haloalkyl, aralkyl, alkenyl, aryl, or aryl substituted with an alkyl, alkoxy, or halo;
each Y is independently an alkylene, aralkylene, or a combination thereof;
G is a divalent residue equal to a diamine of formula $R^3HN$-G-$NHR^3$ minus the two —$NHR^3$ groups;
$R^3$ is hydrogen or alkyl or $R^3$ taken together with G and to the nitrogen to which they are both attached form a heterocyclic group;
each group B is independently a covalent bond, an alkylene of 4-20 carbons, an aralkylene, an arylene, or a combination thereof;
n is independently an integer of 0 to 1500; and
p is an integer of 1 to 10; and
at least one hot organic polymer selected from the group of a hot melt processable thermoplastic, a hot melt processable elastomeric thermoset, a silicone polymer. and mixtures thereof;
wherein the at least one organic polymer is not a copolymer comprising at least two repeat units of Formula I-a, is not a tackifying resin, and is not nylon in the form of fibers; and
wherein the mixture does not occur at the interface between two layers.

2. The mixture of embodiment 1, wherein the copolymer comprises at least two repeat units of Formula I-b:

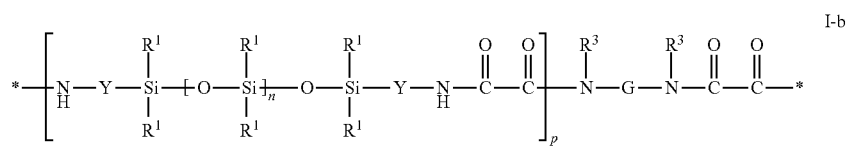

and wherein the at least one organic polymer is not a copolymer comprising at least two repeat units of Formula I-b.

3. The mixture of embodiment 1 or embodiment 2, wherein each $R^1$ of the copolymer is methyl.

4. The mixture of embodiment 1 or embodiment 2, wherein at least 50 percent of the $R^1$ groups of the copolymer are phenyl, methyl, or combinations thereof.

5. The mixture of any one of embodiments 1 through 4, wherein each Y of the copolymer is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

6. The mixture of embodiment 5, wherein Y is an alkylene having 1 to 4 carbon atoms.

7. The mixture of any one of embodiments 1 through 6, wherein the copolymer has a first repeat unit where p is equal to 1 and a second repeat unit where p is at least 2.

8. The mixture of any one of embodiments 1 through 7, wherein G of the copolymer is an alkylene, heteroalkylene, arylene, aralkylene, polydiorganosiloxane, or a combination thereof.

9. The mixture of any one of embodiments 1 through 8, wherein n of the copolymer is at least 40.

10. The mixture of any one of embodiments 1 through 9, wherein $R^3$ of the copolymer is hydrogen.

11. A composition comprising a mixture of any one of embodiments 1 through 10 and at least one tackifying material.

12. The composition of embodiment 11 wherein the tackifying material is a silicate resin or an organic tackifier.

13. A mixture or composition of any one of embodiments 1 through 12 further comprising one or more additives that are not hot melt processable.

14. A vibration damping constrained layer construction comprising at least one substrate having a stiffness and at least one layer comprising a tackified composition of embodiment 11, wherein the tackified composition is fixed to the substrate.

15. A vibration damping composite comprising a flexible substrate coated thereon a composition of any one of embodiments 11 through 13 or a mixture of any one of embodiments 1 through 10.

16. A bi-directional vibration damping constrained layer construction comprising at least two rigid members, each rigid member having a broad surface proximate to a broad surface of another rigid member and closely spaced therefrom and a tackified composition of any one of embodiments 11 through 13, wherein the tackified composition is contained between the closely spaced rigid members and adhered to the members.

17. A pressure sensitive adhesive article comprising a flexible substrate and coated thereon a tackified composition of any one of embodiments 11 through 13.

18. A pressure sensitive adhesive article comprising a layer comprising a mixture of any one of embodiments 1 through 10 or a composition of any one of embodiments 11 through 13 having a surface that is non-tacky and a surface that is tacky.

19. A release coated article comprising a flexible substrate and coated thereon a mixture of any one of embodiments 1 through 10 or a composition of any one of embodiments 11 through 13.

20. An article comprising a mixture of any one of embodiments 1 through 10 or a composition of any one of embodiments 11 through 13.

21. The article of embodiment 20, further comprising a substrate, wherein the mixture or composition comprising the copolymer is in a layer adjacent to the substrate.

22. The article of embodiment 21, further comprising a first substrate and a second substrate, wherein the mixture or composition comprising the copolymer is in a layer positioned between the first substrate and the second substrate.

23. A multilayer film comprising one or more layers comprising a mixture of any one of embodiments 1 through 10 or a composition of any one of embodiments 11 through 13.

24. A process for producing the mixture of any one of embodiments 1 through 10 or composition of any one of embodiments 11 through 13, wherein the process comprises: continuously providing at least one polydiorganosiloxane polyamide-containing component and at least one organic polymer to a vessel; mixing the components to form a mixture; and conveying the mixture from the vessel.

25. The process of embodiment 24 wherein the mixing is under substantially solventless conditions.

26. A process for producing the mixture of any one of embodiments 1 through 10 or a composition of any one of embodiments 11 through 13, wherein the process comprises: continuously providing reactant components for making at least one polydiorganosiloxane polyamide and at least one organic polymer that is not reactive with the reactant components; mixing the components; allowing the reactant components to react to form a polydiorganosiloxane amide segmented copolymer, and conveying the mixture from the reactor.

The foregoing describes the invention in terms of embodiments foreseen by the inventor for which an enabling description was available, notwithstanding that insubstantial modifications of the invention, not presently foreseen, may nonetheless represent equivalents thereto.

EXAMPLES

These examples are merely for illustrative purposes only and are not meant to be limiting on the scope of the appended claims. All parts, percentages, ratios, and the like in the examples are by weight, unless noted otherwise. Solvents and other reagents used were obtained from Sigma-Aldrich Chemical Company; Milwaukee, Wis. unless otherwise noted.

| Table of Abbreviations | |
|---|---|
| Abbreviation or Trade Designation | Description |
| 14K PDMS diamine | A polydimethylsiloxane diamine with an average molecular weight of about 14,000 g/mole that was prepared as described in U.S. Pat. No. 5,214,119 |
| THF | Tetrahydrofuran |
| DEO | Diethyl oxalate |
| Siliconized polycoated kraft paper liner | A siliconized polycoated kraft paper liner that is Sn catalyzed with an easy release on one side and a medium release on the other side commercially available from Loparex Inc., Willowbrook, IL. |
| MORTHANE | Thermoplastic elastomeric polyurethane available from Morton International, Inc., Chicago, IL |
| CRYSTAR PC | Amorphous PET- CPET resins include those such as Crystar.RTM. 5005 from E. I. du Pont de Nemours and Company (DuPont) |
| PEN | Polymer produced by 3M Company comprising the reaction product ethylene glycol and dimethyl 2,6-naphthalene dicarboxylate |
| CoPEN | Polymer produced by 3M Company comprising the reaction product ethylene glycol and dimethyl 2,6-naphthalene dicarboxylate and dimethyl terephthalate |
| SPS - Questra MA405 | SPS homopolymer, syndiotactic polystyrene from Dow Chemical Co. |
| MAKROLON PC3158 | A polycarbonate from Bayer Material Science |
| Exxon 129.24 | Low density polyethylene resin available from ExxonMobil Chemical Company, Houston, TX |
| Exxon | Linear low density polyethylene resin available from |

-continued

Table of Abbreviations

| Abbreviation or Trade Designation | Description |
|---|---|
| EXACT 5181 | ExxonMobil Chemical Company, Houston, TX |
| mLDPE | Medium linear low-density polyethylene available from ExxonMobil Chemical Company, Houston, TX |
| ENGAGE 8200 | A poly-alpha-olefins based thermoplastic elastomeric material such as an ethylene/poly-alpha-olefin copolymer available from Dow Plastics Co. of Midland, MI |
| KRATON G1657 | Linear styrene-(ethylene-propylene) block copolymers available from Shell Chemical Co. |
| PRIMACOR 1410 | PRIMACOR 1410 Copolymer is an ethylene acrylic acid copolymer from Dow Plastics |
| PVC | PVC white resin from, Alphagary Corp., Leonminster, MA |
| PLA | Natureworks LLC 3051D resin available from Natureworks LLC., in Blair, Nebraska, USA |
| SURLYN 1705-1 | An ionomer resin, marketed by the manufacturer, the E. I. DuPont and Company |

Titration Method to Determine Equivalent Weight

Ten (10) grams (precisely weighed) of the compound of Preparative Example 1 was added to a jar. Approximately 50 grams THF solvent (not precisely weighed) was added. The contents were mixed using a magnetic stir bar mix until the mixture was homogeneous. The theoretical equivalent weight of precursor was calculated and then an amount of N-hexylamine (precisely weighed) in the range of 3 to 4 times this number of equivalents was added. The reaction mixture was stirred for a minimum of 4 hours. Bromophenol blue (10-20 drops) was added and the contents were mixed until homogeneous. The mixture was titrated to a yellow endpoint with 1.0N (or 0.1N) hydrochloric acid. The number of equivalents of precursor was equal to the number of equivalents of N-hexylamine added to the sample minus the number of equivalents of hydrochloric acid added during titration. The equivalent weight (grams/equivalent) was equal to the sample weight of the precursor divided by the number of equivalents of the precursor.

Inherent Viscosity (IV) for Polydiorganosiloxane Polyoxamide Block Copolymer

Average inherent viscosities (IV) were measured at 30° C. using a Canon-Fenske viscometer (Model No. 50 P296) in a tetrahydrofuran (THF) solution at 30° C. at a concentration of 0.2 grams per deciliter (g/dL). Inherent viscosities of the materials of the invention were found to be essentially independent of concentration in the range of 0.1 to 0.4 g/dL. The average inherent viscosities were averaged over 3 or more runs. Any variations for determining average inherent viscosities are set forth in specific Examples.

Preparative Example 1

A sample of 14K PDMS diamine (830.00 grams) was placed in a 2-liter, 3-neck resin flask equipped with a mechanical stirrer, heating mantle, nitrogen inlet tube (with stopcock), and an outlet tube. The flask was purged with nitrogen for 15 minutes and then, with vigorous stirring, diethyl oxalate (33.56 grams) was added dropwise. This reaction mixture was stirred for approximately one hour at room temperature and then for 75 minutes at 80° C. The reaction flask was fitted with a distillation adaptor and receiver. The reaction mixture was heated under vacuum (133 Pascals, 1 Torr) for 2 hours at 120° C. and then 30 minutes at 130° C., until no further distillate was able to be collected. The reaction mixture was cooled to room temperature to provide the compound of Formula I product. Gas chromatographic analysis of the clear, mobile liquid showed that no detectable level of diethyl oxalate remained. The ester equivalent weight was determined using $^1$H NMR (equivalent weight equal to 7,916 grams/equivalent) and by titration (equivalent weight equal to 8,272 grams/equivalent).

Preparative Example 2

Into a 20° C. 10-gallon (37.85-Liter) stainless steel reaction vessel, 18158.4 grams of 14K ethyl oxalylamidopropyl terminated polydimethyl siloxane (titrated MW=14,890, which was prepared in a fashion similar to the description in the Preparative Example 1, with the volumes adjusted accordingly) was placed. The vessel was subjected to agitation (75 revolutions per minute (rpm)), and purged with nitrogen flow and vacuum for 15 minutes. The kettle was then heated to 80° C. over the course of 25 minutes. Ethylene diamine (73.29 grams, GFS Chemicals) was vacuum charged into the kettle, followed by 73.29 grams of toluene (also vacuum charged). The kettle was then pressurized to 1 psig (6894 Pa) and heated to a temperature of 120° C. After 30 minutes, the kettle was heated to 150° C. Once a temperature of 150° C. was reached, the kettle was vented over the course of 5 minutes. The kettle was subjected to vacuum (approximately 65 mm Hg, 8665 Pa) for 40 minutes to remove the ethanol and toluene. The kettle was then pressured to 2 psig (13789 Pa) and the viscous molten polymer was then drained into TEFLON coated trays and allowed to cool. The cooled silicone polyoxamide product, polydiorganosiloxane polyoxamide block copolymer, was then ground into fine pellets.

Preparative Example 3

This example was prepared as in Preparative Example 2 except 1.0 mole % of the ethylene diamine (EDA) was replaced with Tris(2-aminoethyl)amine. The IV of this material was determined to be 1.37 g/dL (in THF).

Preparative Example 4

Diethyl oxalate (241.10 grams) was placed in a 3-liter, 3-neck resin flask equipped with a mechanical stirrer, heating mantle, nitrogen inlet tube (with stopcock), and an outlet tube. The flask was purged with nitrogen for 15 minutes and 5K PDMS diamine (a polydimethylsiloxane diamine with an average molecular weight of about 5,000 g/mole that was prepared as described in Example 2 in U.S. Pat. No. 5,214, 119) (2,028.40 grams, MW=4,918) was added slowly with stirring. After 8 hours at room temperature, the reaction flask was fitted with a distillation adaptor and receiver, the contents stirred and heated to 150° C. under vacuum (1 Torr, 133 Pa) for 4 hours, until no further distillate was able to be collected. The remaining liquid was cooled to room temperature to provide 2,573 grams of oxamido ester terminated product. Gas chromatographic analysis of the clear, mobile liquid showed that no detectable level of diethyl oxalate remained. Molecular weight was determined by $^1$H NMR (MW=5,477 grams/mole) and titration (Equivalent weights of 2,573 grams/mole and 2,578 grams/mole).

Preparative Example 5

Into a 20° C. 10-gallon (37.85-Liter) stainless steel reaction vessel, 40 pounds of the material from Preparative Example 4 was placed. The vessel was subjected to agitation (80 rpm) and purged with Nitrogen flow and vacuum for 15 minutes. The reactor was then nitrogen pressurized to 5 pounds per square inch and heated to 90° C. over the course of 25 minutes. Ethylene diamine (0.44 pound) was added to the reactor. This addition was followed by 80 grams of toluene. Next the reactor was heated to a temperature of 105° C. and the pressure on the reactor was slowly vented over the course of 5 minutes. The reactor was then subjected to vacuum (approximately 20 mm Hg, 2666 Pa) for one hour to remove the ethanol and toluene. The reactor was then repressurized to 2 psig (13789 Pa) and the viscous molten product was drained into a TEFLON-coated tray and allowed to cool. The cooled silicone polyoxamide product, was then ground into fine pellets. The IV of this material was determined to be 1.135 g/dL (in THF).

Preparative Example 6

This example was prepared as in Preparative Example 2, except 3.0 mole % of the ethylene diamine (EDA) was replaced with Tris(2-aminoethyl)amine.

Preparative Example 7

Into a 20° C. 10-gallon (37.85-Liter) stainless steel reaction vessel, 18158.4 grams of 5K ethyl oxalylamidopropyl terminated polydimethyl siloxane (titrated MW=5,146, which was prepared in a Preparative Example 4) was placed. The vessel was subjected to agitation (75 rpm), and purged with nitrogen flow and vacuum for 15 minutes. The kettle was then heated to 80° C. over the course of 25 minutes. Ethylene diamine (250.3 grams, GFS Chemicals) was vacuum charged into the kettle, followed by 73.29 grams of toluene (also vacuum charged). The kettle was then pressurized to 1 psig (6894 Pa) and heated to a temperature of 120° C. After 30 minutes, the kettle was heated to 150° C. Once a temperature of 150° C. was reached, the kettle was vented over the course of 5 minutes. The kettle was subjected to vacuum (approximately 65 mm Hg, 8665 Pa) for 40 minutes to remove the ethanol and toluene. The kettle was then pressured to 2 psig (13789 Pa) and the viscous molten polymer was then drained into TEFLON-coated trays and allowed to cool. The cooled amine capped silicone polyoxamide oligomer product, was then ground into fine crumbs.

Color, Haze, and Luminous Transmittance Measurement

The luminous transmittance and haze of the samples were measured according to the American Society for Testing and Materials (ASTM) Test Method D 1003-95 ("Standard Test for Haze and Luminous Transmittance of Transparent Plastic") using a TCS Plus Spectrophotometer from BYK-Gardner Inc., Silver Springs, Md. Color measurements were made using the same instrument, following the CIE (French abbreviation for Commission of Lighting) established international color scale of L*, a*, b*.

Release Test

Samples were prepared for release testing by attaching 3-layer laminates of backing/adhesive/liner to a 17.8-centimeter (cm) by 33-centimeter steel panel using double-coated adhesive tape (commercially available from 3M Company under the trade designation "410B") via the non-release side of the liner using a 2.3 kg rubber roller. The backing/adhesive was then peeled from the liner at 180° at a rate of 2.3 meters/minute (90 inches/minute). All tests were done in a facility at constant temperature (70° C.) and constant humidity (50% RH), unless noted. In the case of shocky peel, the minimum, maximum, and average peel values are all reported to indicate the level of shockiness and a description of the peel is also included. The peel tester used for all examples was an IMass model SP2000 peel tester obtained from IMASS, Inc., Accord, Mass. Measurements were obtained in ounces/inch and in some cases converted to grams per inch.

Release Test for UV Polymerized Adhesive Samples

A 1-mil thick PET film was laminated to the pressure sensitive adhesive side of the sample resulting in a 3 layer construction of 1-mil PET/2-mil pressure sensitive adhesive/liner. The 3 layer sample was prepared for release testing by cutting a test sample strip of 2.54-cm wide by nominally 12 cm in length. The test sample, liner side down, was then attached to the working platen of a an INSTRUMENTORS, Inc. Slip/Peel tester Model 3M90A using a 2.54-cm wide double-coated adhesive tape and a 2.54-cm wide single sided tape (commercially available from 3M Company under the trade designation "9579" and "8403", respectively). The test sample was rolled once on the working platen with a 2.3-kg rubber roller. The backing and pressure sensitive adhesive was then peeled from the liner at 180° at a rate of 2.3 meters/minute (90 inches/minute) over a five second data collection time. A minimum of two samples were tested; the reported release force value is an average of the release force value from each of the test samples. All tests were done in a facility at constant temperature (70° C.) and constant humidity (50% RH) unless noted. Measurements were obtained in ounces/inch and in some cases converted to grams per inch Examples 1-4 and Comparative Examples 1-4

Extrusion Blending Film Making Process

A ¾-inch (0.19-dM) Brabender single screw extruder with a mixing screw was used to produce blended films in the following examples. After melting and mixing, in the single screw extruder, the extrudate was forced through a 6-inch (1.524-dM) flat cast extrusion die to form a molten film. The molten film was then passed through a chilled roll stack to cool and solidify the resins into final, finished film form.

To generate examples for release testing, the adhesive side of four different adhesive products available from 3M Co., Saint Paul, Minn. were laminated to the films.

Four commercial tapes were used: (Red) 3M SCOTCH-CAL 7725-13; (White) 3M SCOTCHCAL 160-30; 845 Book Tape; and 371 Box Tape, all available from 3M Co., Saint Paul, Minn.

Comparative Example 1

A film of 100% Exxon 129.24 low density polyethylene was produced using the above Extrusion Blending Film Making Process. Extrusion zone temperatures of 185° C., 190° C., 195° C., 200° C., 200° C. were used in the extrusion process. The film samples produced had a thickness of approximately 5 mils (125 microns).

Comparative Example 2

One hundred percent (100%) of Preparative Example 2 was fed to the extruder to produce films using the process described above. Extrusion profile temperatures of 100° C., 115° C., 120° C., 140° C., 140° C. were used, the extrusion pressure was 60 pounds (413685 Pa) at 90 rpm. The resultant extruded film was transparent. The resultant extruded film was rubbery and elastic and required the use of a PET carrier liner to carry the material through the chilled nip rolls and winder. The film samples produced had a thickness of approximately 5 mils (125 microns).

Example 1

One percent (1%) of Preparative Example 2 was dry blended with 99% Exxon 129.24 low density polyethylene and fed to the extruder to produce films using the process described above. Extrusion profile temperatures of 100° C., 115° C., 120° C., 140° C., 140° C. were used, extrusion pressure was 610 pounds (4205802 Pa) at 90 rpm. The resultant film had physical properties similar to the polyethylene film in Comparative Example 1. The resultant film was transparent. The film samples produced had a thickness of approximately 5 mils (125 microns).

Example 2

Two percent (2%) of Preparative Example 2 was dry blended with 98% Exxon 129.24 low density polyethylene and fed to the extruder to produce films using the process described above. Extrusion profile temperatures of 100° C., 115° C., 120° C., 140° C., 140° C. were used, extrusion pressure was 500 pounds (3447379 Pa) at 90 rpm. The resultant extruded film was transparent. The film samples produced had a thickness of approximately 5 mils (125 microns).

Example 3

Three percent (3%) of Preparative Example 2 was dry blended with 97% Exxon 129.24 low density polyethylene and was fed to the extruder to produce films using the process described above. Extrusion profile temperatures of 100° C., 115° C., 120° C., 140° C., 140° C. were used, extrusion pressure was 620 pounds (4274750 Pa) at 90 rpm. The resultant extruded film had a transparent, hazy appearance. The film samples produced had a thickness of approximately 5 mils (125 microns).

Example 4

Four percent (4%) of Preparative Example 2 was dry blended with 95% Exxon 129.24 low density polyethylene and was fed to the extruder to produce films using the process described above. Extrusion profile temperatures of 100° C., 115° C., 120° C., 140° C., 140° C. were used, extrusion pressure was 580 pounds (3998959 Pa) at 90 rpm. The resultant extruded film had a transparent, hazy appearance. The film samples produced had a thickness of approximately 5 mils (125 microns).

Comparative Example 3

One hundred percent (100%) Exxon 129.24 low density polyethylene was introduced into the extruder (now at the lower temperatures used in Examples 1-5) and the extruder shut down due to excessive torque. Sample film could not be collected at these extrusion conditions (when the silicone additive of the invention was not present to form a mixture).

Comparative Example 4

A film of 100% Exxon EXACT 5181 linear low density polyethylene was produced using the above steps. Extrusion zone temperatures of 185° C., 190° C., 195° C., 200° C., 200° C. were used in the extrusion process.

Examples 5-14

These film examples were made with the method described in Comparative Example 4 and Examples 2 and 4. The table below details the type and percentage (%) of each polymer used to create the example films. Extrusion zone temperatures of 185° C., 190° C., 195° C., 200° C., 200° C. were used in the extrusion process to make these examples. The film samples produced had a thickness of approximately 5 mils (125 microns).

Examples 15-17 and Comparative Examples 5-7

The films made in Comparative Examples 1 and 4 and Examples 6-8, were used to make film composites. The PSA/film composite was prepared by coating an acrylic radiation sensitive syrup (isooctyl acrylate:acrylic acid at 90:10 (w/w), that was less than 10% polymerized) using a notched bar coater to form a continuous web of nominally 2 mils (0.002 inch, 0.051 millimeter) thickness on the example films of the invention. The coating was then polymerized to more than 95% by exposing the radiation sensitive syrup to UV radiation in a inert environment, created with nitrogen environment or an overlay with a 1 mil (0.001 inch, 0.025 millimeter) thick polyester terephthalate (PET) film. Upon curing the example films of the invention and the polymerized syrup formed a pressure sensitive adhesive similar to that described in Examples 1-7 in U.S. Pat. No. 4,181,752.

(Note the table will explain what the %'s are of each resin and the manner we used was already described above for both the films and the composite samples.)

TABLE 1

| Example Number | Organic Polymer Mixed With Silicone Block Polymer | Silicone Block Polymer Used in Mixture | Percent Silicone Block Polymer Used | Tape Used for Testing | Release in N/dm | Heat Aged Release in N/dm |
|---|---|---|---|---|---|---|
| Comp. Ex. 4 | Exxon EXACT 5181 | Preparative Example 2 | 0 | 7725-13 adhesive coated graphic film | 2.54 at 24 hrs at RT | 3.20 at 7 days at 65° C. |
| Ex. 5 | Exxon EXACT 5181 | Preparative Example 2 | 2% | 7725-13 adhesive coated graphic film | 1.40 at 24 hrs at RT | 0.70 at 7 days at 65° C. |
| Ex. 6 | Exxon EXACT 5181 | Preparative Example 2 | 4% | 7725-13 adhesive coated graphic film | 1.05 at 24 hrs at RT | 1.57 at 7 days at 65° C. |
| Ex. 7 | Exxon 129.24 low density polyethylene | Preparative Example 2 | 4% | 7725-13 adhesive coated graphic film | 7.88 at 24 hrs at RT | 6.64 at 7 days at 65° C. |
| Comp. Ex. 1 | 129.24 low density polyethylene | Preparative Example 2 | 0 | 7725-13 adhesive coated graphic film | 3.68 at 24 hrs at RT | 7.75 at 7 days at 65° C. |
| Ex. 8 | Exxon 129.24 low density polyethylene | Preparative Example 2 | 2% | 7725-13 adhesive coated graphic film | 6.65 at 24 hrs at RT | 4.52 at 7 days at 65° C. |
| Ex. 9 | Exxon 129.24 low density polyethylene | Preparative Example 5 | 2% | 7725-13 adhesive coated graphic film | 5.25 at 24 hrs at RT | Not tested |
| Ex. 10 | Exxon 129.24 low density polyethylene | Preparative Example 7 | 2% | 7725-13 adhesive coated graphic film | 7.88 at 24 hrs at RT | Not tested |
| Ex. 11 | Exxon 129.24 low density polyethylene | Preparative Example 2 | 2% | 7725-13 adhesive coated graphic film | 4.03 at 24 hrs at RT | Not tested |
| Ex. 12 | Exxon 129.24 low density polyethylene | Preparative Example 6 | 2% | 7725-13 adhesive coated graphic film | 4.38 at 24 hrs at RT | Not tested |
| Ex. 13 | Exxon 129.24 low density polyethylene | Preparative Example 2 | 2% | 7725-13 adhesive coated graphic film | 5.95 at 24 hrs at RT | Not tested |
| Comp. Ex. 1 | Exxon 129.24 low density polyethylene | Preparative Example 2 | 0% | 160-30 adhesive coated graphic film | 9.28 at 3 days at RT | Not tested |
| Ex. 14 | PVC | Preparative Example 2 | 4% | 7725-13 adhesive coated graphic film | Not tested | 10.78 at 7 days at 65° C. |
| Ex. 9 | Exxon 129.24 low density polyethylene | Preparative Example 2 | 2% | 160-30 adhesive coated graphic film | 8.75 at 3 days at RT | Not tested |

TABLE 1-continued

| Example Number | Organic Polymer Mixed With Silicone Block Polymer | Silicone Block Polymer Used in Mixture | Percent Silicone Block Polymer Used | Tape Used for Testing | Release in N/dm | Heat Aged Release in N/dm |
|---|---|---|---|---|---|---|
| Ex. 13 | Exxon 129.24 low density polyethylene | Preparative Example 2 | 4% | 160-30 adhesive coated graphic film | 6.65 at 3 days at RT | Not tested |
| Comp. Ex. 4 | Exxon EXACT 5181 | Preparative Example 2 | 0 | 160-30 adhesive coated graphic film | 2.10 at 3 days at RT | Not tested |
| Ex. 5 | Exxon EXACT 5181 | Preparative Example 2 | 2% | 160-30 adhesive coated graphic film | 0.70 at 3 days at RT | Not tested |
| Ex. 6 | Exxon EXACT 5181 | Preparative Example 2 | 4% | 160-30 adhesive coated graphic film | 0.53 at 3 days at RT | Not tested |
| Comp. Ex. 5 | Exxon 129.24 low density polyethylene | Preparative Example 2 | 0% | UV cured PSA, cured in place on example substrate | 1.74 after 1 week at RT | 0.90 after 1 week at 65° C. |
| Ex. 15 | Exxon 129.24 low density polyethylene | Preparative Example 2 | 2% | UV cured PSA, cured in place on example substrate | 1.06 after 1 week at RT | 0.96 after 1 week at 65° C. |
| Ex. 16 | Exxon 129.24 low density polyethylene | Preparative Example 2 | 4% | UV cured PSA, cured in place on example substrate | 1.59 after 1 week at RT | 0.89 after 1 week at 65° C. |
| Ex. 17 | Exxon EXACT 5181 | Preparative Example 2 | 4% | UV cured PSA, cured in place on example substrate | .46 after 1 week at RT | 0.61 after 1 week at 65° C. |
| Comp. Ex. 6 | Exxon EXACT 5181 | Preparative Example 2 | 0 | UV cured PSA, cured in place on example substrate | 4.04 at 24 hrs at RT | 2.77 at 19 days at RT |
| Comp. Ex. 7 | Siliconized polycoated kraft paper liner | | 0 | UV cured PSA, cured in place on example substrate | 1.00 after 1 week at RT | 0.89. after 1 week at 65° C. |

Example 18

Blended films of polyethylene terephthalate (PET) and Silicone Polyoxamide (Preparative Example 5) were produced as follows: Invista 8602 PET (approximately 0.60 IV) was loaded into a K-Tron Model K-SFS-24/6 pellet feeder (feeder #1). Silicone Polyoxamide was loaded into a similar K-Tron Model K-SFS-24/6 pellet feeder (feeder #2). The outlets of these feeders were placed over the feed throat of a 25-mm Berstroff twin-screw extruder. Downstream from the Berstorff was a neck tube, gear pump, neck tube, feedblock, and 8-inch die. The die was positioned immediately over and in close proximity to a chilled casting roll and associated wind-up equipment. This set-up was utilized to produce cast web samples of film. The die, feedblock, necktubes, and gear pump were all heated to a temperature of 530° F. (277° C.). The twin-screw extruder had a progressive heat profile beginning at 450° F. (232° C.) and increasing to 530° F. (277° C.) over the course of the heat zones.

The Silicone Polyoxamide and Invista 8602 PET resin (available from Invista of Charlotte, N.C. were fed to the extruder at various ratios with a series of melt blended samples produced ranging from 6 to 22 wt % Silicone Polyoxamide dispersed in PET. These approximate 20-mil thick cast web films exhibited varying levels of haze, graffiti resistance, and slip properties, all increasing with the level of Silicone Polyoxamide dispersed in the film.

Example 19

Blended films of polyethylene terephthalate (PET) and Silicone Polyoxamide (Preparative Example 2) were produced as follows: Invista 8602 PET resin (available from Invista of Charlotte, N.C. (approximately 0.60 IV) was loaded into a K-Tron Model K-SFS-24/6 pellet feeder (feeder #1). Silicone Polyoxamide was loaded into a similar K-Tron Model K-SFS-24/6 pellet feeder (feeder #2). The outlets of these feeders were placed over the feed throat of a 25-mm Berstroff twin-screw extruder. Downstream from the Berstorff was a neck tube, gear pump, neck tube, feedblock, and 8-inch die. The die was positioned immediately over and in close proximity to a chilled casting roll and associated wind-up equipment. This set-up was utilized to produce cast web samples of film. The die, feedblock, necktubes, and gear pump were all heated to a temperature of 530° F. (277° C.). The twin-screw extruder had a progressive heat profile beginning at 450° F. (232° C.) and increasing to 530° F. (277° C.) over the course of the heat zones.

The Silicone Polyoxamide and Invista PET were fed to the extruder at various ratios with a series of melt blended samples produced ranging from 6 to 22 wt % Silicone Polyoxamide dispersed in PET. These approximately 20-mil thick cast web films exhibited varying levels of haze, graffiti resistance, and slip properties, all increasing with the level of Silicone Polyoxamide dispersed in the film.

Example 20

Blended films of Low Melt PEN (an approximately 0.48 IV polymer produced by 3M company comprising the reaction product of ethylene glycol and 90 mol % (on esters basis) dimethyl 2,6-naphthalene dicarboxylate and 10 mol % (on esters basis) Dimethyl Terephthalate)) and Silicone Polyoxamide (Preparative Example 3) were produced as follows: Low Melt PEN was loaded into a K-Tron Model K-SFS-24/6 pellet feeder (feeder #1). Silicone Polyoxamide was loaded into a similar K-Tron Model K-SFS-24/6 pellet feeder (feeder #2). The outlets of these feeders were placed over the feed throat of a 25-mm Berstroff twin-screw extruder. Downstream from the Berstorff was a neck tube, gear pump, neck tube, feedblock, and 8-inch die. The die was positioned immediately over and in close proximity to a chilled casting roll and associated wind-up equipment. This set-up was utilized to produce cast web samples of film. The die, feedblock, necktubes and gear pump were all heated to a temperature of 530° F. (277° C.). The twin-screw extruder had a progressive heat profile beginning at 450° F. (232° C.) and increasing to 530° F. (277° C.) over the course of the heat zones.

The Silicone Polyoxamide and Low Melt PEN were fed to the extruder at various ratios with a series of melt blended samples produced ranging from 6 to 22 wt % Silicone Polyoxamide dispersed in Low Melt PEN. These approximate 20-mil thick cast web films exhibited varying levels of haze, graffiti resistance, and slip properties, all increasing with the level of Silicone Polyoxamide dispersed in the film.

Example 21

Blended films of polyethylene naphthalate (PEN) (a approximately 0.48 IV polymer produced by 3M company comprising the reaction product ethylene glycol and Dimethyl 2,6-Naphthalene Dicarboxylate) and Silicone Polyoxamide (Preparative Example 2) were produced as follows: PEN was loaded into a K-Tron Model K-SFS-24/6 pellet feeder (feeder #1). Silicone Polyoxamide was loaded into a similar K-Tron Model K-SFS-24/6 pellet feeder (feeder #2). The outlets of these feeders were placed over the feed throat of a 25-mm Berstroff twin-screw extruder. Downstream from the Berstorff was a neck tube, gear pump, neck tube, feedblock, and 8-inch die. The die was positioned immediately over and in close proximity to a chilled casting roll and associated wind-up equipment. This set-up was utilized to produce cast web samples of film. The die, feedblock, necktubes, and gear pump were all heated to a temperature of 540° F. (282° C.). The twin-screw extruder had a progressive heat profile beginning at 480° F. (249° C.) and increasing to 540° F. (282° C.) over the course of the heat zones.

The Silicone Polyoxamide and PEN were fed to the extruder at various ratios with a series of melt blended samples produced ranging from 5 to 70 wt % Silicone Polyoxamide dispersed in PEN. These approximately 25-mil thick cast web films exhibited varying levels of haze, graffiti resistance, and slip properties, all increasing with the level of Silicone Polyoxamide dispersed in the film.

Examples 22-43 and Comparative Examples 8-13

Ten-gram (10-gram) batches were dry blended by hand, in the percentage shown in Table 2 below, and fed into a DSM micro 15 extruder. Each batch was pushed into the extruder using a plunger. Each sample was mixed 2-4 minutes at 150 rpm except for Examples 28-31 which were mixed at 100 rpm. The melted mixture came out the end of the extruder into a small heated cylinder for molding into bars or onto a heated piece of aluminum for creating pressed sheets. The cylinder was placed in front of a die and a plunger forced the material into the die. The material on the sheet of aluminum had another sheet of aluminum placed on top and was put into a Carver hydraulic press. The press was set at the same temperature used for extrusion of the example. The material was flattened as the platens came together. Each sample used a different amount of pressure to obtain desired thickness of 5 mils.

The materials were tested according to the Release Test and the results reported below in Tables 3 and 4.

TABLE 2

| Example Number | Percent and Type Organic Polymer Mixed with Preparative Example 2 | Percent Preparative Example 2 | Process Temperature Used (° C.) | 10 g batches | |
| --- | --- | --- | --- | --- | --- |
| | | | | Preparative Example 2 (in grams) | Organic Polymer (in grams) |
| Ex. 22 | 99.5% MORTHANE PE44-203 | 0.50% | 196 | 0.05 | 9.95 |

TABLE 2-continued

| Example Number | Percent and Type Organic Polymer Mixed with Preparative Example 2 | Percent Preparative Example 2 | Process Temperature Used (° C.) | 10 g batches Preparative Example 2 (in grams) | Organic Polymer (in grams) |
|---|---|---|---|---|---|
| Ex. 23 | 98.25% MORTHANE PE44-203 | 1.75% | 196 | 0.175 | 9.825 |
| Ex. 24 | 97% MORTHANE PE44-203 | 3.00% | 196 | 0.3 | 9.7 |
| Ex. 25 | 75% MORTHANE PE44-203 | 25.00% | 196 | 2.5 | 7.5 |
| Comp. Ex. 8 | 100% KRATON G1567 | 0.00% | 196 | 10 | 0 |
| Ex. 26 | 99.5% KRATON G1567 | 0.50% | 196 | 0.5 | 9.95 |
| Ex. 27 | 98.25% KRATON G1567 | 1.75% | 196 | 0.175 | 9.825 |
| Ex. 28 | 97% KRATON G1567 | 3.00% | 196 | 0.3 | 9.7 |
| Ex. 29 | 20% KRATON G1567 | 80.00% | 196 | 8 | 2 |
| Ex. 30 | 75% KRATON G1567 | 25.00% | 196 | 2.5 | 7.5 |
| Comp. Ex. 9 | 100% SPS | 0.00% | 274 | 10 | 0 |
| Ex. 31 | 99.5% SPS | 0.50% | 274 | 0.5 | 9.95 |
| Ex. 32 | 98.25% SPS | 1.75% | 274 | 0.175 | 9.825 |
| Ex. 33 | 97% SPS | 3.00% | 274 | 0.3 | 9.7 |
| Comp. Ex. 10 | 100% CRYSTAR PC | 0.00% | 274 | 10 | 0 |
| Ex. 34 | 99.5% CRYSTAR PC | 0.50% | 274 | 0.5 | 9.95 |
| Ex. 35 | 98.25% CRYSTAR PC | 1.75% | 274 | 0.175 | 9.825 |
| Ex. 36 | 97% CRYSTAR PC | 3.00% | 274 | 0.3 | 9.7 |
| Comp. Ex. 11 | 100% PET | 0.00% | 274 | 10 | 0 |
| Ex. 37 | 99.5% PET | 0.50% | 274 | 0.5 | 9.95 |
| Ex. 38 | 98.25% PET | 1.75% | 274 | 0.175 | 9.825 |
| Ex. 39 | 97% PET | 3.00% | 274 | 0.3 | 9.7 |
| Comp. Ex. 12 | 100% ENGAGE 8200 | 0.00% | 196 | 10 | 0 |
| Ex. 40 | 99.5% ENGAGE 8200 | 0.50% | 196 | 0.5 | 9.95 |
| Ex. 41 | 98.25% ENGAGE 8200 | 1.75% | 196 | 0.175 | 9.825 |
| Ex. 42 | 97% ENGAGE 8200 | 3.00% | 196 | 0.3 | 9.7 |
| Ex. 43 | 0.5% ENGAGE 8200 | 99.50% | 196 | 10 | 0 |
| Comp. Ex. 13 | None | 100.00% | 196 | 0 | 10 |

TABLE 3

Results of Release Testing the Examples of 22-43 and Comparative Examples 8-13 Using Book Tape 845

| Example Number | Percent and Type Organic Polymer Mixed with Silicone Block Polymer | Percent of Silicone Block Polymer Used | Release (N/dm) Room Temp. | Heat Aged Release (N/dm) 4 Days at 65° C. |
|---|---|---|---|---|
| Ex. 22 | 99.5% MORTHANE PE44-203 | 0.50% | 38.4 | 84.2 |
| Ex. 23 | 98.25% MORTHANE PE44-203 | 1.75% | 41.0 | 96.4 |
| Ex. 24 | 97% MORTHANE PE44-203 | 3.00% | 45.0 | 95.2 |
| Ex. 25 | 75% MORTHANE PE44-203 | 25.00% | 35.8 | 64.1 |
| Comp. Ex. 8 | 100% KRATON G1567 | 0.00% | 6.3 | 24.7 |
| Ex. 26 | 99.5% KRATON G1567 | 0.50% | 6.3 | 17.9 |
| Ex. 27 | 98.25% KRATON G1567 | 1.75% | 8.2 | 22.5 |
| Ex. 28 | 97% KRATON G1567 | 3.00% | 7.7 | 20.5 |
| Ex. 29 | 20% KRATON G1567 | 80.00% | 0.5 | 1.1 |
| Ex. 30 | 75% KRATON G1567 | 25.00% | 5.5 | 24.6 |

TABLE 3-continued

Results of Release Testing the Examples of 22-43
and Comparative Examples 8-13 Using Book Tape 845

| Example Number | Percent and Type Organic Polymer Mixed with Silicone Block Polymer | Percent of Silicone Block Polymer Used | Release (N/dm) Room Temp. | Heat Aged Release (N/dm) 4 Days at 65° C. |
|---|---|---|---|---|
| Comp. Ex. 9 | 100% SPS | 0.00% | 21.9 | 34.8 |
| Ex. 31 | 99.5% SPS | 0.50% | 4.4 | 36.8 |
| Ex. 32 | 98.25% SPS | 1.75% | 9.1 | 30.5 |
| Ex. 33 | 97% SPS | 3.00% | 13.2 | 22.8 |
| Comp. Ex. 10 | 100% CRYSTAR PC | 0.00% | 17.4 | 20.5 |
| Ex. 34 | 99.5% CRYSTAR PC | 0.50% | 27.8 | 36.1 |
| Ex. 35 | 98.25% CRYSTAR PC | 1.75% | 12.5 | 54.3 |
| Ex. 36 | 97% CRYSTAR PC | 3.00% | 14.0 | 50.1 |
| Comp. Ex. 11 | 100% PEN | 0.00% | 11.0 | 64.0 |
| Ex. 37 | 99.5% PEN | 0.50% | 31.9 | 62.6 |
| Ex. 38 | 98.25% PEN | 1.75% | 41.0 | 59.6 |
| Ex. 39 | 97% PEN | 3.00% | 24.1 | 56.5 |
| Comp. Ex. 12 | 100% ENGAGE 8200 | 0.00% | 3.3 | 17.5 |
| Ex. 40 | 99.5% ENGAGE 8200 | 0.50% | 3.1 | 11.2 |
| Ex. 41 | 98.25% ENGAGE 8200 | 1.75% | 3.4 | 13.5 |
| Ex. 42 | 97% ENGAGE 8200 | 3.00% | 2.8 | 8.2 |
| Ex. 43 | 0.5% ENGAGE 8200 | 99.50% | 8.0 | 24.8 |
| Comp. Ex. 13 | None | 100.00% | 0.5 | 1.3 |

TABLE 4

Results of Release Testing the Examples of 22-43
and Comparative Examples 8-13 Using Box Tape 371

| Example Number | Percent and Type Organic Polymer Mixed with Preparative Example 2 | Percent Silicone Block Polymer Used | Release (N/dm) Room Temp. | Heat Aged Release (N/dm) 4 Days at 65° C. |
|---|---|---|---|---|
| Ex. 22 | 99.5% MORTHANE PE44-203 | 0.50% | 17.6 | 32.6 |
| Ex. 23 | 98.25% MORTHANE PE44-203 | 1.75% | 15.5 | 31.6 |
| Ex. 24 | 97% MORTHANE PE44-203 | 3.00% | 16.5 | 31.7 |
| Ex. 25 | 75% MORTHANE PE44-203 | 25.00% | 11.0 | 33.1 |
| Comp. Ex. 8 | 100% KRATON G1567 | 0.00% | 20.2 | Not tested |
| Ex. 26 | 99.5% KRATON G1567 | 0.50% | 18.7 | Not tested |
| Ex. 27 | 98.25% KRATON G1567 | 1.75% | 18.7 | Not tested |
| Ex. 28 | 97% KRATON G1567 | 3.00% | 20.1 | Not tested |
| Ex. 29 | 20% KRATON G1567 | 80.00% | 0.3 | 0.7 |
| Ex. 30 | 75% KRATON G1567 | 25.00% | 12.4 | 38.2 |
| Comp. Ex. 9 | 100% SPS | 0.00% | 34.5 | 46.7 |
| Ex. 31 | 99.5% SPS | 0.50% | 6.3 | 26.1 |
| Ex. 32 | 98.25% SPS | 1.75% | 11.5 | 55.1 |
| Ex. 33 | 97% SPS | 3.00% | 22.3 | 27.4 |
| Comp. Ex. 10 | 100% CRYSTAR PC | 0.00% | 16.1 | 59.7 |
| Ex. 34 | 99.5% CRYSTAR PC | 0.50% | 27.6 | 18.3 |
| Ex. 35 | 98.25% CRYSTAR PC | 1.75% | 17.0 | 42.2 |
| Ex. 36 | 97% CRYSTAR PC | 3.00% | 17.7 | 38.3 |
| Comp. Ex. 11 | 100% PEN | 0.00% | 9.0 | 51.5 |
| Ex. 37 | 99.5% PEN | 0.50% | 31.6 | 48.2 |
| Ex. 38 | 98.25% PEN | 1.75% | 28.4 | 48.7 |
| Ex. 39 | 97% PEN | 3.00% | 25.6 | 29.6 |
| Comp. Ex. 12 | 100% ENGAGE 8200 | 0.00% | 21.9 | 36.4 |
| Ex. 40 | 99.5% ENGAGE 8200 | 0.50% | 22.4 | 37.1 |
| Ex. 41 | 98.25% ENGAGE 8200 | 1.75% | 26.0 | 32.8 |
| Ex. 42 | 97% ENGAGE 8200 | 3.00% | 22.0 | 20.6 |
| Ex. 43 | 0.5% ENGAGE 8200 | 99.50% | 22.4 | 43.8 |
| Comp. Ex. 13 | None | 100.00% | 0.4 | 0.8 |

Examples 44-47 and Comparative Example 14

The compounded blends (compositions of which are reported in Table 5) were mixed by hand and flood feed into a 1¼ Killion Single Screw extruder, compression ration 2.93:1. The material melted and mixed in the extruder. The melted material was metered thru a necktube into a 6-inch (1.524-dM) flat film die. The molten material came out the die onto a heated chrome roll and was nipped with a rubber roll. Throat cooling was needed to prevent surging.

Extrusion conditions were monitored to record processing conditions as the percentage of silicone block copolymer varied. The results are reported in Table 6.

The materials were tested according to the Release Test and the results reported below in Table 7.

TABLE 5

| | | | 2268 gram batch | |
|---|---|---|---|---|
| Example Number | Percentage Preparative Example 2 | Percentage mLDPE | Preparative Example 2 (grams) | mLDPE (grams) |
| Comp. Ex. 14 | | 100% | 0 | 2268 |
| Ex. 44 | 0.05% | 99.95% | 1.134 | 2266.828 |
| Ex. 45 | 0.10% | 99.90% | 2.268 | 2265.694 |
| Ex. 46 | 0.50% | 99.50% | 11.340 | 2154.563 |
| Ex. 47 | 2.50% | 97.50% | 56.699 | 2211.263 |

TABLE 6

Single Screw Extrusion Data

| Example Number | Zone 1 (° C.) | Zone 2 (° C.) | Zone 3 (° C.) | Clamp Ring (° C.) | Necktube (° C.) | Die (° C.) | Speed (rpm) | Pressure (Pascals) | Amps | Melt Temp. (° C.) |
|---|---|---|---|---|---|---|---|---|---|---|
| Extruder set points | 257.22 | 282.22 | 279.44 | 279.44 | 279.44 | 279.44 | 44 | | | |
| Comp. Ex. 14 | 246.11 | 282.78 | 279.44 | 279.44 | 279.44 | 279.44 | 43.9 | 17236893 | 17 | 291.11 |
| Ex. 44 | 223.33 | 282.22 | 279.44 | 278.89 | 278.89 | 279.44 | 43.2 | 15168466 | 14 | 287.22 |
| Ex. 45 | 222.78 | 282.22 | 279.44 | 278.89 | 278.89 | 279.44 | 43.2 | 13789515 | 13 | 283.33 |
| Ex. 46 | 221.11 | 281.11 | 277.78 | 279.44 | 279.44 | 279.44 | 44.1 | 13789515 | 10 | 287.22 |
| Ex. 47 | 222.78 | 281.67 | 280.00 | 279.44 | 277.22 | 279.44 | 43.2 | 13100039 | 9 | 286.11 |

TABLE 7

| | | Release testing Results | |
|---|---|---|---|
| Example Number | Percent Preparative Example 2 | Percent mLDPE | Tape Used for Testing | Release (N/dm at Room Temp., 1 Minute Dwell) |
| Comp. Ex. 14 | — | 100% | Book tape 845 | 12.5 |
| Ex. 44 | 0.05% | 99.95% | Book tape 845 | 13.3 |
| Ex. 45 | 0.10% | 99.90% | Book tape 845 | 12.3 |
| Ex. 46 | 0.50% | 99.50% | Book tape 845 | 11.3 |
| Ex. 47 | 2.50% | 97.50% | Book tape 845 | 9.3 |
| Comp. Ex. 14 | — | 100% | Box tape 371 | 12.4 |
| Ex. 44 | 0.05% | 99.95% | Box tape 371 | 10.9 |
| Ex. 45 | 0.10% | 99.90% | Box tape 371 | 10.7 |
| Ex. 46 | 0.50% | 99.50% | Box tape 371 | 9.4 |
| Ex. 47 | 2.50% | 97.50% | Box tape 371 | 10.3 |

Examples 48-51 and Comparative Example 15

The compounded blends (compositions of which are reported in Table 8) were mixed by hand and flood fed into a Berstroff ultra glide 25-mm twin screw extruder with L/D 36:1 with a K-Tron feeder KCLK20 at 10 pounds per hour. The extruder melted and mixed the materials which were metered out a one hole die. This created one strand which was cooled in a water bath. The molten material came out the die in a stand and was cooled in a water bath after which it is dried and chopped into pellets.

Extrusion conditions were monitored to record processing conditions as the percentage of silicone block copolymer varied. The results are reported in Table 9.

TABLE 8

| | | | 4535 gram batch | |
|---|---|---|---|---|
| Example Number | Percent Preparative Example 2 | Percent mLDPE | Preparative Example 2 (grams) | mLDPE (grams) |
| Comp. Ex. 15 | — | 100% | 0 | 4536 |
| Ex. 48 | 0.05% | 99.95% | 2.268 | 4533.655 |
| Ex. 49 | 0.10% | 99.90% | 4.536 | 4531.387 |
| Ex. 50 | 0.50% | 99.50% | 22.680 | 4309.127 |
| Ex. 51 | 2.50% | 97.50% | 113.398 | 4422.525 |

TABLE 9

Twin Screw Extrusion Data

| Example Number | Extruder speed (rpm) | Feed-throat (° C.) | Zone 1 (° C.) | Zone 2 (° C.) | Zone 3 (° C.) | Zone 4 (° C.) | Zone 5 (° C.) | Zone 6 (° C.) | Zone 7 (° C.) | Zone 8 (° C.) | Zone 9 (° C.) | Zone 10 (° C.) | Melt Temp. (° C.) | Pressure (Pa) | Amps | Percent Torque |
|---|---|---|---|---|---|---|---|---|---|---|---|---|---|---|---|---|
| Set points | | 249 | 254 | 254 | 254 | 254 | 254 | 254 | 254 | 254 | 254 | | | | | |
| Comp. Ex. 15 | 325 | 248 | 253 | 256 | 256 | 257 | 257 | 259 | 257 | 257 | 260 | 302 | 301.67 | 7191231.8 | 39 | 72 |
| Ex. 48 | 325 | 247 | 253 | 255 | 256 | 256 | 257 | 257 | 256 | 256 | 260 | 301 | 300.56 | 6853388.7 | 37 | 69 |
| Ex. 49 | 325 | 248 | 257 | 261 | 252 | 253 | 251 | 252 | 254 | 259 | 258 | 295 | 295.00 | 6563808.9 | 33 | 61 |
| Ex. 50 | 325 | 247 | 249 | 251 | 252 | 251 | 250 | 251 | 253 | 248 | 249 | 293 | 293.33 | 6363861 | 30 | 58 |
| Ex. 51 | 325 | 248 | 253 | 251 | 252 | 251 | 250 | 251 | 253 | 253 | 251 | 290 | 290.00 | 5819175.1 | 28 | 51 |

Examples 52-55 and Comparative Examples 16 and 17

These film examples were made per the method described in Examples 6-19. Table 10 below details the type and percentage of each polymer used to create the example films.

TABLE 10

| Example Number | Organic Polymer Mixed with Silicone Block Polymer | Silicone Block Polymer Used | Percent Silicone Block Polymer Used | Tape Used for Testing | Heat Aged Release N/dm, 7 Days at 65° C. |
| --- | --- | --- | --- | --- | --- |
| Comp. Ex. 16 | PRIMACOR 1410 | Preparative Example 2 | 0 | 7725-13 adhesive coated graphic film | 20.65 |
| Ex. 52 | PRIMACOR 1410 | Preparative Example 2 | 2% | 7725-13 adhesive coated graphic film | 22.76 |
| Ex. 53 | PRIMACOR 1410 | Preparative Example 2 | 4% | 7725-13 adhesive coated graphic film | 22.23 |
| Comp. Ex. 17 | SURLYN 1705-1 | Preparative Example 2 | 0% | 7725-13 adhesive coated graphic film | 33.78 |
| Ex. 54 | SURLYN 1705-1 | Preparative Example 2 | 2% | 7725-13 adhesive coated graphic film | 30.28 |
| Ex. 55 | SURLYN 1705-1 | Preparative Example 2 | 4% | 7725-13 adhesive coated graphic film | 30.81 |

Examples 56-58 and Comparative Example 18

The compounded blends were mixed by hand and flood fed into a 1¼ Killion Single Screw extruder, compression ration 2.93:1. The material melted and mixed in the extruder. The melted material was metered thru a necktube into a 6-inch (1.524-dM) flat film die. The molten material came out the die onto a heated chrome roll and was nipped with a rubber roll. Throat cooling was needed to prevent surging. The amounts for each example are in Table 11 below. The cooled film was tested for release properties with Box tape 371.

TABLE 11

| Example Number | Polymer Mixed With Silicone Block Polymer | Percentage Silicone Block Polymer Used | Tape Used for Testing | Release (N/dm) Room Temperature for 4 Days |
| --- | --- | --- | --- | --- |
| Comp. Ex. 18 | 100% PLA | 0% | Box Tape 371 | 63.67 |
| Ex. 56 | 99.5% PLA | 0.50% | Box Tape 371 | 65.42 |
| Ex. 57 | 98.25% PLA | 1.75% | Box Tape 371 | 58.31 |
| Ex. 58 | 97.5% PLA | 2.50% | Box Tape 371 | 52.07 |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A composition comprising:
   a bodycare composition; and
   an additive, wherein the additive comprises a mixture comprising:
   at least one copolymer comprising at least two repeat units of Formula I-b:

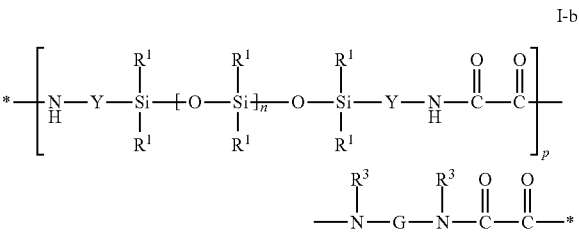

wherein:
   each $R^1$ is independently an alkyl, haloalkyl, aralkyl, alkenyl, aryl, or aryl substituted with an alkyl, alkoxy, or halo;
   each Y is independently an alkylene, aralkylene, or a combination thereof;
   G is a divalent residue equal to a diamine of formula $R^3HN-G-NHR^3$ minus the two $NHR^3$ groups, wherein G is an alkylene, heteroalkylene, arylene, aralkylene, or a combination thereof;
   $R^3$ is hydrogen or alkyl or $R^3$ taken together with G and to the nitrogen to which they are both attached form a heterocyclic group;
   n is independently an integer of 0 to 1500; and
   p is an integer of 1 to 10; and
   at least one thermoplastic organic polymer.

2. The composition of claim 1, wherein each $R^1$ of the copolymer is methyl.

3. The composition of claim 1, wherein each Y of the copolymer is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

4. The composition of claim 1, wherein the copolymer has a first repeat unit where p is equal to 1 and a second repeat unit where p is at least 2.

5. The composition of claim 1, wherein n of the copolymer is at least 40.

6. A medical article comprising:
a mixture comprising:
at least one copolymer comprising at least two repeat units of Formula I-b:

$$\left[ \begin{array}{c} \underset{H}{N} - Y - \underset{\underset{R^1}{|}}{\overset{\overset{R^1}{|}}{Si}} -\left(O - \underset{\underset{R^1}{|}}{\overset{\overset{R^1}{|}}{Si}}\right)_n- O - \underset{\underset{R^1}{|}}{\overset{\overset{R^1}{|}}{Si}} - Y - \underset{H}{N} - \overset{O}{\overset{\|}{C}} - \overset{O}{\overset{\|}{C}} \end{array} \right]_p \begin{array}{c} \overset{R^3}{|}\\ N - G - \overset{R^3}{\underset{|}{N}} - \overset{O}{\overset{\|}{C}} - \overset{O}{\overset{\|}{C}} - * \end{array} \qquad \text{I-b}$$

wherein:
each $R^1$ is independently an alkyl, haloalkyl, aralkyl, alkenyl, aryl, or aryl substituted with an alkyl, alkoxy, or halo;
each Y is independently an alkylene, aralkylene, or a combination thereof;
G is a divalent residue equal to a diamine of formula $R^3HN$-G-$NHR^3$ minus the
two $NHR^3$ groups, wherein G is an alkylene, heteroalkylene, arylene, aralkylene,
or a combination thereof;
$R^3$ is hydrogen or alkyl or $R^3$ taken together with G and to the nitrogen to which they are both attached form a heterocyclic group;
n is independently an integer of 0 to 1500; and
p is an integer of 1 to 10; and
at least one organic polymer selected from the group of a hot melt processable
thermoplastic, a hot melt processable elastomeric thermoset, a silicone polymer,
and mixtures thereof; wherein the at least one organic polymer is not a copolymer
comprising at least two repeat units of Formula I-b, is not a tackifying resin, and
is not nylon in the form of fibers.

7. The medical article of claim 6, wherein the medical article is a contact lens.

8. The medical article of claim 6, wherein the medical article is a medical tape.

9. The medical article of claim 6, wherein the medical article is a drug delivery device.

10. The medical article of claim 6, wherein the medical article is a medical backing.

11. A pressure sensitive adhesive article comprising:
a pressure sensitive adhesive comprising:
a pressure sensitive composition; and
an additive, wherein the additive comprises a mixture comprising:
at least one copolymer comprising at least two repeat units of Formula I-b:

$$\left[ \begin{array}{c} \underset{H}{N} - Y - \underset{\underset{R^1}{|}}{\overset{\overset{R^1}{|}}{Si}} -\left(O - \underset{\underset{R^1}{|}}{\overset{\overset{R^1}{|}}{Si}}\right)_n- O - \underset{\underset{R^1}{|}}{\overset{\overset{R^1}{|}}{Si}} - Y - \underset{H}{N} - \overset{O}{\overset{\|}{C}} - \overset{O}{\overset{\|}{C}} \end{array} \right]_p \begin{array}{c} \overset{R^3}{|}\\ N - G - \overset{R^3}{\underset{|}{N}} - \overset{O}{\overset{\|}{C}} - \overset{O}{\overset{\|}{C}} - * \end{array} \qquad \text{I-b}$$

wherein:
each $R^1$ is independently an alkyl, haloalkyl, aralkyl, alkenyl, aryl, or aryl substituted with an alkyl, alkoxy, or halo;
each Y is independently an alkylene, aralkylene, or a combination thereof;
G is a divalent residue equal to a diamine of formula $R^3HN$-G-$NHR^3$ minus the
two $NHR^3$ groups, wherein G is an alkylene, heteroalkylene, arylene, aralkylene,
or a combination thereof;
$R^3$ is hydrogen or alkyl or $R^3$ taken together with G and to the nitrogen to which they are both attached form a heterocyclic group;
n is independently an integer of 0 to 1500; and
p is an integer of 1 to 10; and
at least one thermoplastic organic polymer.

12. The article of claim 11, wherein each $R^1$ of the copolymer is methyl.

13. The article of claim 11, wherein each Y of the copolymer is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

14. The article of claim 11, wherein the copolymer has a first repeat unit where p is equal to 1 and a second repeat unit where p is at least 2.

15. The article of claim 11, wherein n of the copolymer is at least 40.

16. The article of claim 11, wherein the pressure sensitive adhesive article comprises a transfer tape.

17. The article of claim 16, wherein the transfer tape is coated on a differential release liner.

18. The article of claim 11, wherein the pressure sensitive adhesive is attached to a prepared or unprepared surface comprising a metal, a polyolefin film, or a fluorine containing polymeric film.

19. The article of claim 11, wherein the pressure sensitive adhesive provides a protective coating to prevent ingress of contaminants to a bonded surface.

20. The article of claim 11, where the pressure sensitive article comprises a pressure sensitive adhesive patch.

21. A hot melt adhesive article comprising:
a hot melt adhesive composition comprising:
a mixture comprising:
at least one copolymer comprising at least two repeat units of Formula I-b:

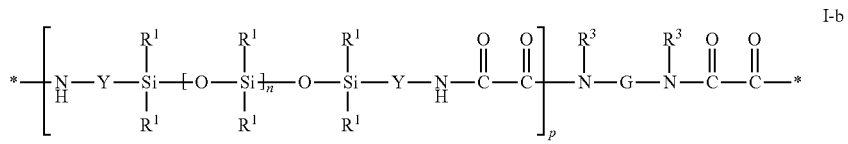

wherein:
each $R^1$ is independently an alkyl, haloalkyl, aralkyl, alkenyl, aryl, or aryl substituted with an alkyl, alkoxy, or halo;
each Y is independently an alkylene, aralkylene, or a combination thereof;
G is a divalent residue equal to a diamine of formula $R^3HN\text{-}G\text{-}NHR^3$ minus the
two $NHR^3$ groups, wherein G is an alkylene, heteroalkylene, arylene, aralkylene,
or a combination thereof;
$R^3$ is hydrogen or alkyl or $R^3$ taken together with G and to the nitrogen to which they are both attached form a heterocyclic group;
n is independently an integer of 0 to 1500; and
p is an integer of 1 to 10; and
at least one organic polymer selected from the group of a hot melt processable thermoplastic, a hot melt processable elastomeric thermoset, a silicone polymer,
and mixtures thereof; wherein the at least one organic polymer is not a copolymer
comprising at least two repeat units of Formula I-b, is not a tackifying resin, and
is not nylon in the form of fibers.

22. The article of claim 21, further comprising a heat shrink tube.

* * * * *

UNITED STATES PATENT AND TRADEMARK OFFICE
CERTIFICATE OF CORRECTION

PATENT NO.         : 9,567,458 B2
APPLICATION NO.    : 15/057454
DATED              : February 14, 2017
INVENTOR(S)        : Audrey Sherman It is certified that error appears in the above-identified patent and that said Letters Patent is hereby corrected as shown below:

In the Specification

Column 5
Line 9, Delete "—Rα-Ar$^a$—" and insert -- —R$^a$-Ar$^a$— --, therefor.
Line 51, Delete ""aminoxalyl"" and insert -- "aminooxalyl" --, therefor.
Line 55, Delete ""aminoxalylamino"" and insert -- "aminooxalylamino" --, therefor.
Line 56, Delete "NH" and insert -- —NH --, therefor.

Column 8
Line 35, Delete "URETHENE" and insert -- URETHANE --, therefor.

Column 9
Line 21, Delete "Lubruzol" and insert -- Lubrizol --, therefor.

Column 12
Line 24, Delete "aminoxalylamino" and insert -- aminooxalylamino --, therefor.

Column 14
Line 66, Delete "(CH2=CH—)" and insert -- (CH2═CH—) --, therefor.

Column 20
Line 54, Delete "W" and insert -- M$^+$ --, therefor.

Column 22
Line 31-32, Delete "bis (2,4,6-trichlorophenyl)" and insert -- bis(2,4,6-trichlorophenyl) --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,567,458 B2

Column 25
Line 63, Delete "by" and insert -- be --, therefor.

Column 32
Line 65, Delete "Material Science" and insert -- MaterialScience --, therefor.

Column 33
Line 16, Delete "Leonminster," and insert -- Leominster, --, therefor.

Column 36
Line 39, Delete "a an" and insert -- an --, therefor.
Line 54, After "inch" insert -- . --.

Column 41
Line 64, Delete "Berstroff" and insert -- Berstorff --, therefor.

Column 43
Line 14, Delete "Berstroff" and insert -- Berstorff --, therefor.
Line 46, Delete "Berstroff" and insert -- Berstorff --, therefor.

Column 44
Line 19, Delete "Berstroff" and insert -- Berstorff --, therefor.

Column 48
Line 41, Delete "ration" and insert -- ratio --, therefor.

Column 49
Line 42, Delete "Berstroff" and insert -- Berstorff --, therefor.

Column 51
Line 35, Delete "ration" and insert -- ratio --, therefor.